US012722956B2

(12) United States Patent
Lee et al.

(10) Patent No.: US 12,722,956 B2
(45) Date of Patent: Sep. 1, 2026

(54) SCISSOR LIFT AND MOBILE ROBOT HAVING THE SAME

(71) Applicant: SAMSUNG ELECTRONICS CO., LTD., Suwon-si (KR)

(72) Inventors: Minhee Lee, Suwon-si (KR); Sanghyun Kang, Suwon-si (KR); Hyunsuk Kwak, Suwon-si (KR); Jaemyung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 18/912,062

(22) Filed: Oct. 10, 2024

(65) Prior Publication Data

US 2025/0136422 A1 May 1, 2025

Related U.S. Application Data

(63) Continuation of application No. PCT/KR2024/012849, filed on Aug. 28, 2024.

(30) Foreign Application Priority Data

Oct. 27, 2023 (KR) ........................ 10-2023-0145495

(51) Int. Cl.
*B66F 11/04* (2006.01)
*B66F 17/00* (2006.01)

(52) U.S. Cl.
CPC .......... *B66F 11/042* (2013.01); *B66F 17/006* (2013.01)

(58) Field of Classification Search
CPC ....... B66F 11/042; B66F 17/006; B66F 7/065
See application file for complete search history.

(56) References Cited

U.S. PATENT DOCUMENTS 1,947,647 A * 2/1934 Holden .................. F16M 11/42 182/69.5
3,817,346 A * 6/1974 Wehmeyer ................ E04G 1/22 182/69.5

(Continued)

FOREIGN PATENT DOCUMENTS

CN 109969983 A * 7/2019 ................ B66F 7/08
DE 102012006745 A1 * 10/2013 .............. B66F 7/065

(Continued)

OTHER PUBLICATIONS

International Search Report and Written Opinion (PCT/ISA/210 and PCT/ISA/237) dated Dec. 16, 2024, issued by International Searching Authority for International Application No. PCT/KR2024/012849.

*Primary Examiner* — Minh Truong
*Assistant Examiner* — Michelle M Mudwilder
(74) *Attorney, Agent, or Firm* — Sughrue Mion, PLLC

(57) ABSTRACT

A scissor lift includes: a fixed plate; a lifting plate above the fixed plate; a pair of scissor arms between the fixed plate and the lifting plate and having an X shape, the pair of scissor arms including a first scissor arm and a second scissor arm, each of the first scissor arm and the second scissor arm including a fixed end fixed to the fixed plate and a moving end configured to move linearly with respect to the fixed plate; a motor configured to move the moving end of the first scissor arm and the moving end of the second scissor arm; a load reduction device configured to reduce a load applied to the motor in a case where the lifting plate descends, wherein the load reduction device includes a plurality of elastic bodies on the moving end of the first scissor arm and connected in series.

18 Claims, 19 Drawing Sheets

(56) References Cited

U.S. PATENT DOCUMENTS

| | | | | |
|---|---|---|---|---|
| 4,712,653 | A * | 12/1987 | Franklin | B66F 7/08 187/269 |
| 4,764,075 | A * | 8/1988 | Cox | B65G 1/07 211/59.3 |
| 5,054,578 | A * | 10/1991 | Smillie, III | B60R 5/04 187/269 |
| 5,722,513 | A * | 3/1998 | Rowan | B66F 7/065 187/269 |
| 10,167,652 | B2 | 1/2019 | Nakakubo et al. | |
| 10,306,977 | B2 * | 6/2019 | Wong | A47B 9/16 |
| 10,856,651 | B2 * | 12/2020 | Huang | A47B 9/16 |
| 11,526,141 | B2 | 12/2022 | Matlin | |
| 2003/0006099 | A1 * | 1/2003 | Boucher | B66F 7/08 187/269 |
| 2005/0045426 | A1 | 3/2005 | Rennetaud et al. | |
| 2022/0289540 | A1 * | 9/2022 | Galin | B60P 3/007 |
| 2023/0173694 | A1 * | 6/2023 | Sohmshetty | B60P 7/13 |
| 2024/0327185 | A1 * | 10/2024 | Wanaka | B66F 9/07559 |

FOREIGN PATENT DOCUMENTS

| | | | | |
|---|---|---|---|---|
| EP | 1512655 | A1 * | 3/2005 | B66B 9/02 |
| JP | 7-38314 | Y2 | 8/1995 | |
| JP | 7-267594 | A | 10/1995 | |
| JP | 10-157989 | A | 6/1998 | |
| JP | 5264050 | B2 | 8/2013 | |
| JP | 2018-70361 | A | 5/2018 | |
| JP | 2021-59441 | A | 4/2021 | |
| KR | 20-0213365 | Y1 | 4/2001 | |
| KR | 10-1223959 | B1 | 1/2013 | |
| KR | 10-1901275 | B1 | 9/2018 | |
| KR | 10-2358427 | B1 | 2/2022 | |
| WO | WO-2005068346 | A1 * | 7/2005 | B66F 11/042 |

* cited by examiner

SCISSOR LIFT AND MOBILE ROBOT HAVING THE SAME

CROSS-REFERENCE TO RELATED APPLICATIONS

This application is a bypass continuation application of International Application No. PCT/KR2024/012849, filed on Aug. 28, 2024, which is based on and claims the benefit of Korean Patent Application No. 10-2023-0145495, filed on Oct. 27, 2023, in the Korean Intellectual Property Office, the disclosure of each of which is incorporated by reference herein in its entirety.

BACKGROUND

1. Field

Embodiments of the present disclosure relate to a scissor lift and a mobile robot having the same.

2. Brief Description of Background Art

Mobile robots are widely used in various fields such as manufacturing, logistics, services, and the like.

For example, a mobile robot may transport a variety of objects, such as materials or parts, to workers or consumers.

The mobile robot may include a lift that adjusts the height of an object to facilitate loading and unloading of the object.

The lift is disposed on an upper surface of the mobile robot and may adjust the height of the object according to the height of the loading and unloading area.

SUMMARY

According to embodiments of the present disclosure, a scissor lift is provided and may include: a fixed plate; a lifting plate above the fixed plate; a pair of scissor arms between the fixed plate and the lifting plate and having an X shape, the pair of scissor arms including a first scissor arm and a second scissor arm, each of the first scissor arm and the second scissor arm including a fixed end fixed to the fixed plate and a moving end configured to move linearly with respect to the fixed plate; a motor configured to move the moving end of the first scissor arm and the moving end of the second scissor arm; a load reduction device configured to reduce a load applied to the motor in a case where the lifting plate descends, wherein the load reduction device may include a plurality of elastic bodies on the moving end of the first scissor arm and connected in series.

According to one or more embodiments of the present disclosure, the load reduction device may further include: a moving bracket connected to the moving end of the first scissor arm, wherein one end of the plurality of elastic bodies is connected to the moving bracket; a plurality of engaging plates at another end of the plurality of elastic bodies and between the plurality of elastic bodies; a plurality of stopping plates configured to selectively engage with the plurality of engaging plates; and a string winder adjacent to the fixed end of the first scissor arm and including a string connected to an engaging plate furthest from the moving bracket among the plurality of engaging plates.

According to one or more embodiments of the present disclosure, the plurality of elastic bodies may include: a first elastic body, wherein one end of the first elastic body is connected to the moving bracket; and a second elastic body connected in series to the first elastic body.

According to one or more embodiments of the present disclosure, the plurality of engaging plates may include: a first engaging plate between another end of the first elastic body and one end of the second elastic body; and a second engaging plate at another end of the second elastic body and connected to the string of the string winder.

According to one or more embodiments of the present disclosure, the plurality of stopping plates may include: a first stopping plate configured to stop the first engaging plate; and a second stopping plate spaced a defined distance away from the first stopping plate and configured to not stop the first engaging plate and to stop the second engaging plate.

According to one or more embodiments of the present disclosure, the first elastic body and the second elastic body may have a same spring constant as each other.

According to one or more embodiments of the present disclosure, a spring constant of the first elastic body may be greater than a spring constant of the second elastic body.

According to one or more embodiments of the present disclosure, the scissor lift may further include a stopping plate moving device including an actuator; and a processor configured to control the stopping plate moving device to move the plurality of stopping plates according to a weight of an object on the lifting plate.

According to one or more embodiments of the present disclosure, the scissor lift may further include a weight detection sensor configured to measure the weight of the object on the lifting plate, wherein the processor is further configured to control the stopping plate moving device based on a signal from the weight detection sensor.

According to one or more embodiments of the present disclosure, the scissor lift may further include a load detector configured to detect a size of the load applied to the motor, wherein the processor is further configured to control the stopping plate moving device based on a signal from the load detector.

According to one or more embodiments of the present disclosure, in a case where the lifting plate is located at a lowest height, all the plurality of engaging plates may be stopped by the plurality of stopping plates.

According to one or more embodiments of the present disclosure, in a case where the lifting plate is located at a highest height, the plurality of engaging plates may not stopped by the plurality of stopping plates.

According to embodiments of the present disclosure, a mobile robot is provided and may include: a main body configured to travel autonomously; and a scissor lift on an upper surface of the main body, wherein the scissor lift may include: a fixed plate; a lifting plate above the fixed plate; a pair of scissor arms between the fixed plate and the lifting plate and having an X shape, the pair of scissor arms including a first scissor arm and a second scissor arm, each of the first scissor arm and the second scissor arm including a fixed end fixed to the fixed plate and a moving end configured to move linearly with respect to the fixed plate; a motor configured to move the moving end of the first scissor arm and the moving end of the second scissor arm; and a load reduction device configured to reduce a load applied to the motor in a case where the lifting plate descends, and wherein the load reduction device may include a first elastic body and a second elastic body that are on the moving end of the first scissor arm and connected in series.

According to one or more embodiments of the present disclosure, the load reduction device may further include: a moving bracket connected to the moving end of the first scissor arm, wherein one end of the first elastic body is connected to the moving bracket; a first engaging plate at another end of the first elastic body, wherein one end of the second elastic body is connected to the first engaging plate and the second elastic body is disposed in a straight line with the first elastic body; a second engaging plate at another end of the second elastic body; a first stopping plate configured to stop the first engaging plate; and a second stopping plate spaced apart from the first stopping plate by a defined distance, and the second stopping plate configured to not stop the first engaging plate and to stop the second engaging plate.

According to one or more embodiments of the present disclosure, a spring constant of the first elastic body may be greater than a spring constant of the second elastic body.

According to embodiments of the present disclosure, a lift is provided and may include: a fixed plate; a lifting plate above the fixed plate; a scissor arm between the fixed plate and the lifting plate and having an X shape, the scissor arm including a fixed end fixed to the fixed plate and a moving end configured to move linearly with respect to the fixed plate; a motor configured to move the moving end of the scissor arm; a load reduction device configured to reduce a load applied to the motor in a case where the lifting plate descends, wherein the load reduction device may include a plurality of elastic bodies on the moving end of the scissor arm and connected in series.

BRIEF DESCRIPTION OF DRAWINGS

These and/or other aspects, features, and advantages of certain embodiments of the present disclosure will be more apparent from the following description taken in conjunction with the accompanying drawings, in which.

DETAILED DESCRIPTION

Figure 1:
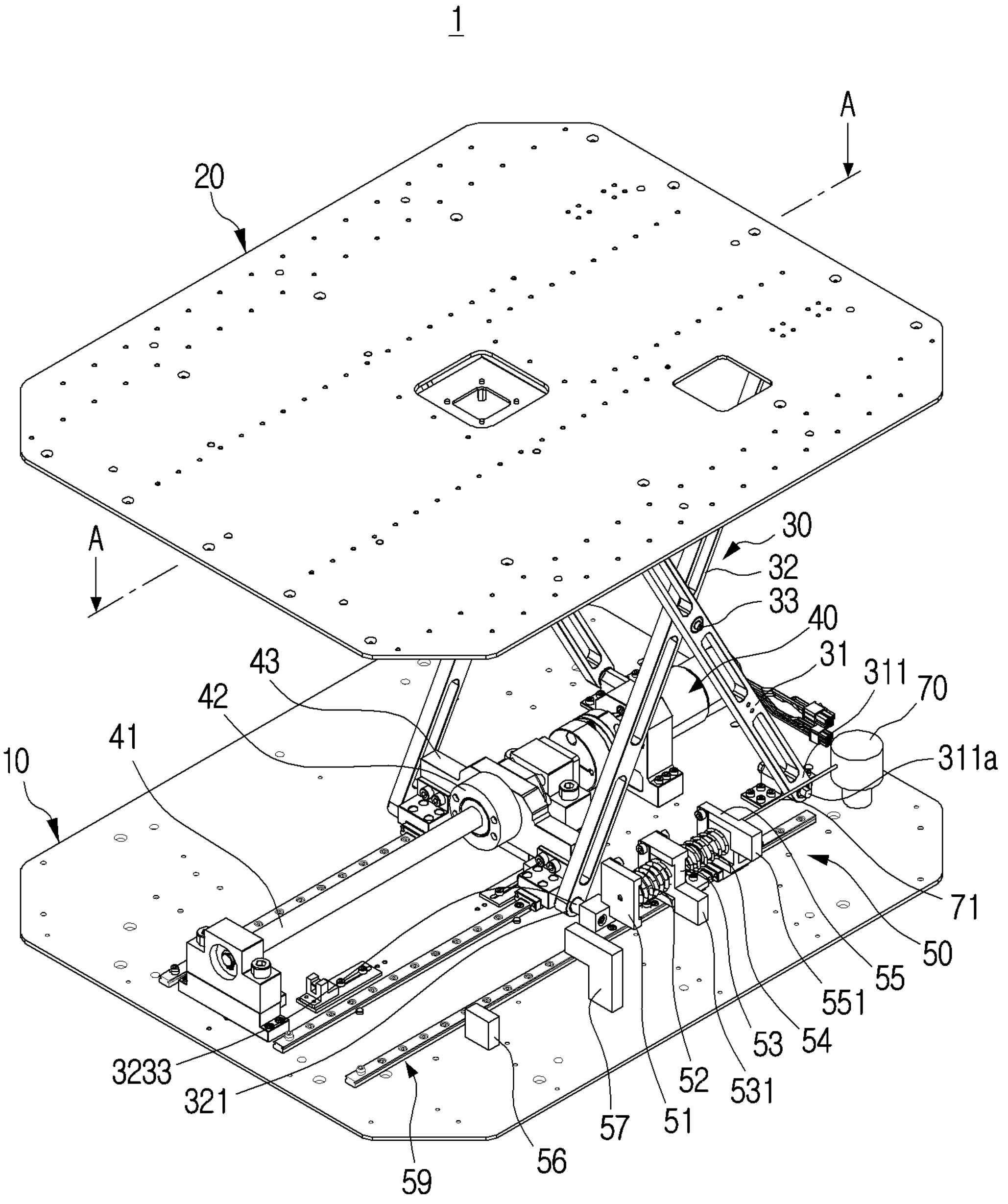
FIG. 1 is a perspective view illustrating a scissor lift according to one or more embodiments of the present disclosure.

Various example embodiments of this document and terms used herein are not intended to limit the scope of the present disclosure, and embodiments of the present disclosure should be understood to include various modifications, equivalents, and alternatives of the example embodiments.

In connection with the description of the drawings, similar reference numbers may be used for similar or related components.

The singular form of a noun corresponding to an item may include one or more of the above item, unless the relevant context clearly indicates otherwise.

In this document, each of phrases such as "A or B," "at least one of A and B," "at least one of A or B," "A, B, or C," "at least one of A, B, and C," "at least one of A, B, C" may include any one of the items listed together with the corresponding phrase, or any possible combination thereof.

The term "and/or" includes any element of a plurality of related described elements or a combination of a plurality of related described elements.

Terms such as "first," "second," "primary," or "secondary" may be used simply to distinguish one component from other components, and do not limit the corresponding components in other respects (e.g., importance or order).

When it is mentioned that one (e.g., first) component is "coupled" or "connected" to another (e.g., second) component with or without terms "functionally" or "communicatively," it means that the one component can be connected to the another component directly (e.g., wired), wirelessly, or through a third component.

Terms such as "include" or "have" are intended to designate the presence of features, numbers, steps, operations, components, parts, or combinations thereof described in the embodiment, but do not preclude the presence or addition of one or more other features, numbers, steps, operations, components, parts, or combination thereof.

When a component is said to be "connected," "coupled," "supported," or "in contact" with another component, this means not only cases where the components are directly connected, coupled, supported, or contacted, but also cases where the components are indirectly connected, coupled, supported, or contacted through a third component.

When a component is said to be located "on" other component, this includes not only cases where the component is in contact with the other component, but also cases where another component exits between the two components.

Further, the terms "leading end," "rear end," "upper side," "lower side," "top end," "bottom end," etc., used in the present disclosure are defined with reference to the drawings. However, the shape and position of each component are not limited by the terms.

Embodiments of the present disclosure relate to a scissor lift that can use a motor with a lower rated capacity by allowing a load applied to the motor to decrease as a height of a lifting plate is lowered, and to a mobile robot equipped with such a scissor lift.

Hereinafter, a scissor lift 1 according to one or more embodiments of the present disclosure will be described in detail with reference to FIGS. 1 to 4.

Figure 2:
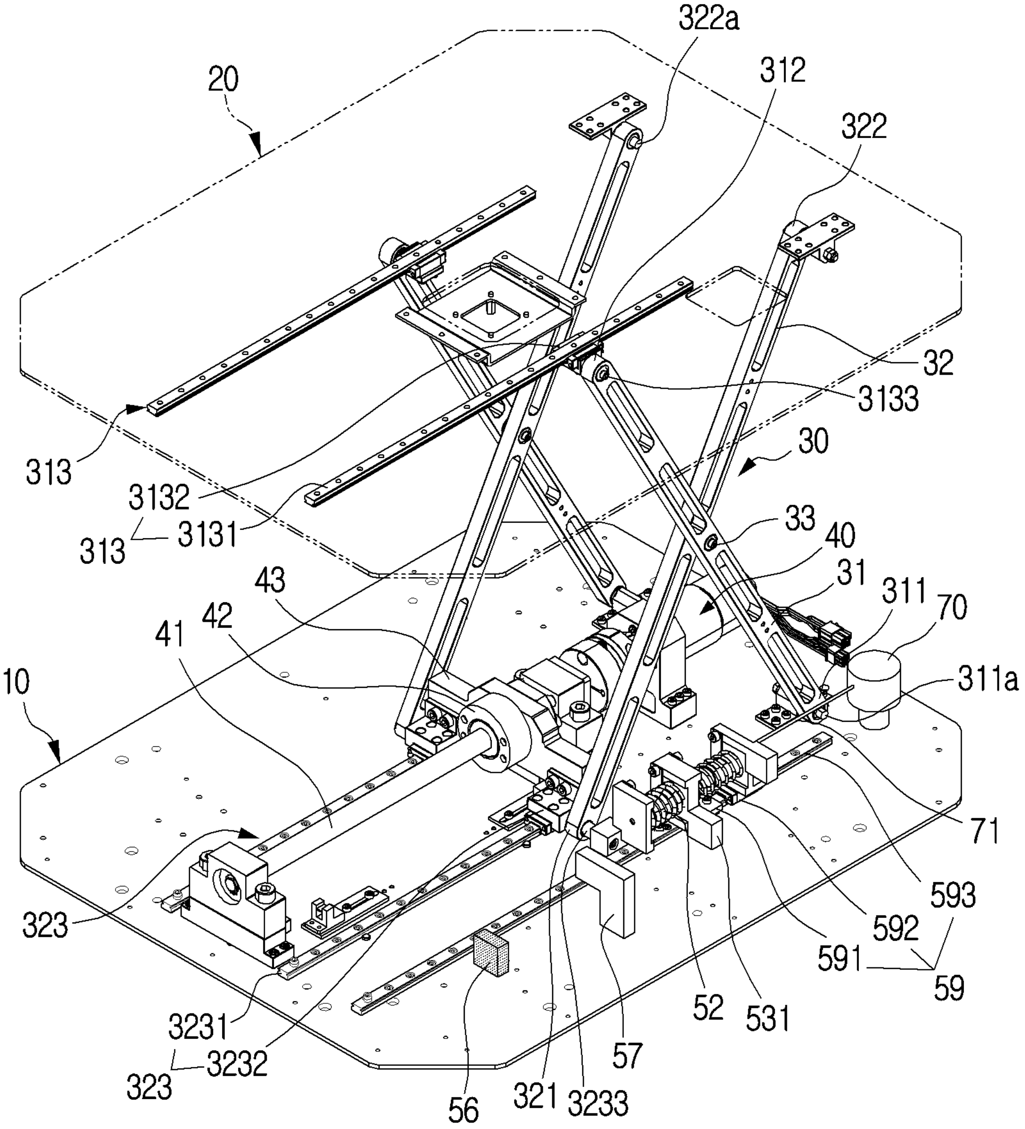
FIG. 2 is a perspective view illustrating a scissor lift according to one or more embodiments of the present disclosure with a lifting plate indicated by an imaginary line.
Figure 3:
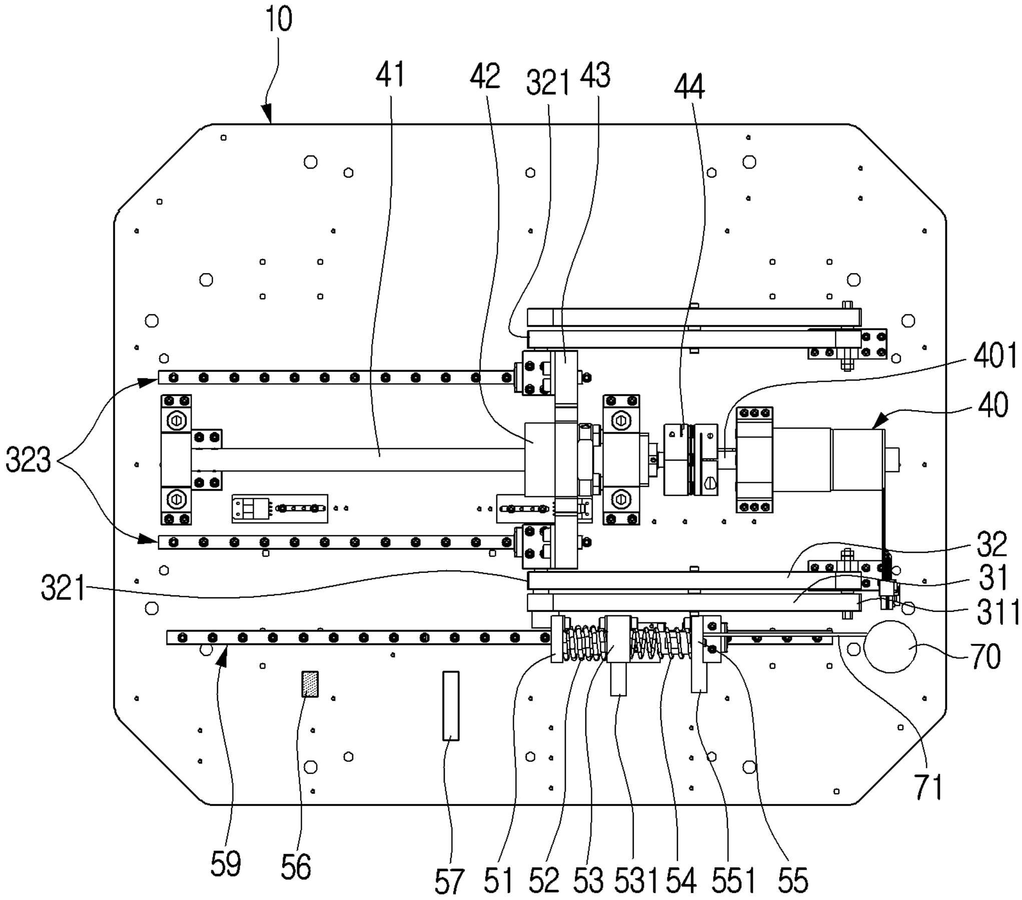
FIG. 3 is a cross-sectional view illustrating the scissor lift of FIG. 1 taken along a line A-A.
Figure 4:
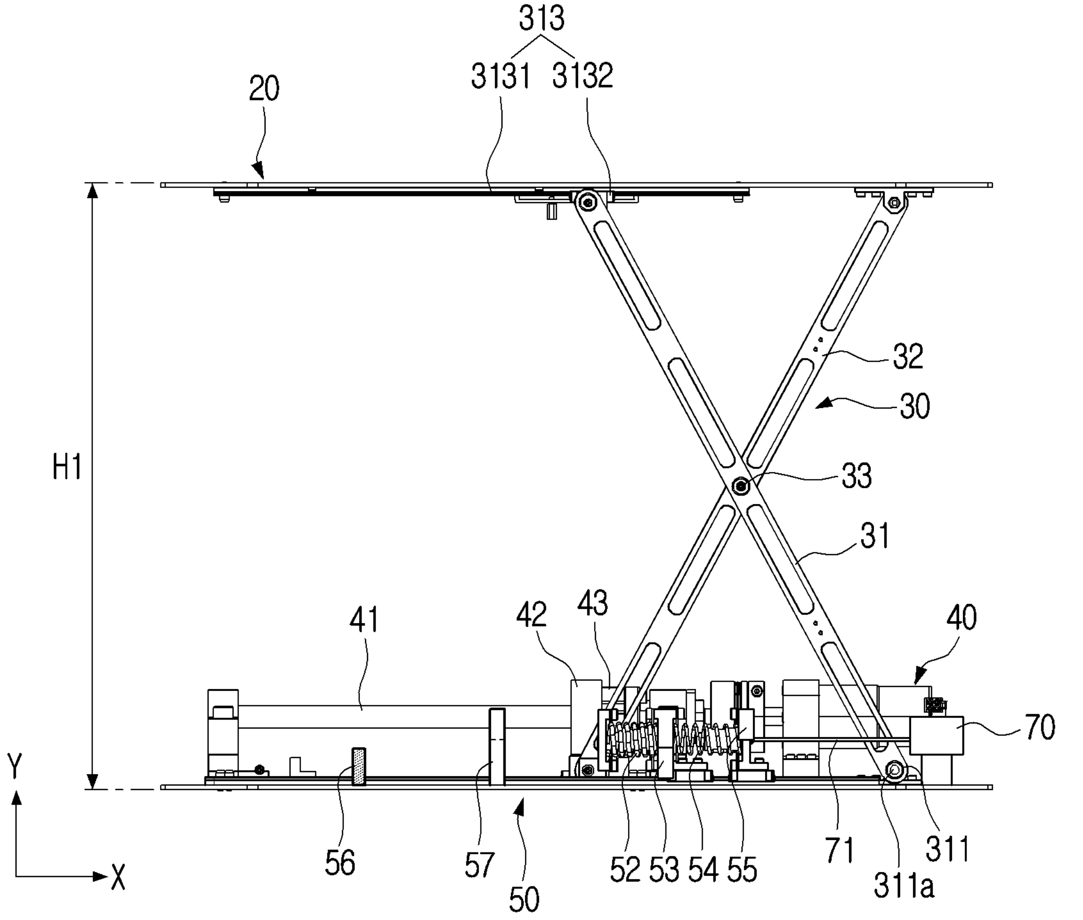
FIG. 4 is a side view of the scissor lift of FIG. 1.

FIG. 1 is a perspective view illustrating a scissor lift 1 according to one or more embodiments of the present disclosure. FIG. 2 is a perspective view illustrating the scissor lift 1 according to one or more embodiments of the present disclosure with a lifting plate 20 indicated by an imaginary line. FIG. 3 is a cross-sectional view illustrating the scissor lift 1 of FIG. 1 taken along a line A-A. FIG. 4 is a side view of the scissor lift 1 of FIG. 1.

Referring to FIGS. 1 to 4, the scissor lift 1 according to one or more embodiments of the present disclosure may include a fixed plate 10, a lifting plate 20, a pair of scissor arms 30, a motor 40, and a load reduction device 50.

The fixed plate 10 may be formed to install and support the scissor lift 1. The fixed plate 10 may be formed as a flat plate of an approximately rectangular shape.

The lifting plate 20 may be disposed above the fixed plate 10. The lifting plate 20 may be spaced apart from the fixed plate 10 by a defined distance. The lifting plate 20 is disposed to move in a vertical direction with respect to the fixed plate 10. The lifting plate 20 is formed to support an object to be moved up and down. That is, the object may be placed on the upper surface of the lifting plate 20.

The lifting plate 20 may be formed as a flat plate having an approximately rectangular shape corresponding to the fixed plate 10. The lifting plate 20 may be formed to have a size corresponding to the fixed plate 10. The lifting plate 20 may be formed to have approximately the same size as the fixed plate 10.

The pair of scissor arms 30 may be disposed between the fixed plate 10 and the lifting plate 20. The pair of scissor arms 30 may be disposed parallel to each other at a defined interval on the upper surface of the fixed plate 10. Each of the pair of scissor arms 30 may be formed in an X-shape similar to scissors. Each of the pair of scissor arms 30 may include a fixed end 311 fixed to the fixed plate 10 and a moving end 321 that moves in a straight line with respect to the fixed plate 10. The pair of scissor arms 30 are formed with the same structure, so one scissor arm 30 will be described below.

The scissor arm 30 may include two arms (e.g., a first arm 31 and a second arm 32) coupled in an X shape. A rotating pin 33 may be disposed at the center of the first arm 31 and the second arm 32. The first arm 31 and the second arm 32 are coupled to rotate around the rotating pin 33.

The lower end of the first arm 31 is disposed so that the first arm 31 may pivot at a defined angle at a defined position on the fixed plate 10. That is, the lower end of the first arm 31 forms the fixed end 311 fixed at a defined position of the fixed plate 10. The upper end of the first arm 31 is disposed to move in a straight line with respect to the lifting plate 20. That is, the upper end of the first arm 31 forms an upper moving end 312 that moves linearly with respect to the lifting plate 20.

The upper end of the second arm 32 is disposed so that the second arm 32 may pivot at a defined angle at a defined position on the lifting plate 20. That is, the upper end of the second arm 32 forms an upper fixed end 322 fixed at a defined position on the lower surface of the lifting plate 20. The lower end of the second arm 32 is disposed to move linearly with respect to the fixed plate 10. That is, the lower end of the second arm 32 forms the moving end 321 that moves linearly with respect to the fixed plate 10.

Therefore, while the fixed end 311 of the scissor arm 30 is fixed to the fixed plate 10, the moving end 321 of the scissor arm 30 may move in a straight line with respect to the fixed plate 10. At the same time, while the upper fixed end 322 of the scissor arm 30 is fixed to the lifting plate 20, the upper moving end 312 of the scissor arm 30 may move in a straight line with respect to the lifting plate 20. Accordingly, when the moving end 321 of the scissor arm 30 moves in a straight line with respect to the fixed plate 10, the lifting plate 20 may move up and down.

The lower end of the first arm 31 may be rotatably disposed on a fixing pin 311*a* disposed on the upper surface of the fixed plate 10. Accordingly, the first arm 31 may pivot a certain angle around the fixing pin 311*a*.

The upper end of the first arm 31 may be disposed to be guided by an upper linear motion (LM) guide member 313 disposed on the lower surface of the lifting plate 20. For example, the upper linear motion guide member 313 may include an upper LM guide 3131 and an upper LM block 3132. The upper LM block 3132 is disposed to move linearly along the upper LM guide 3131.

The upper end of the first arm 31 may be rotatably disposed on the upper LM block 3132. A moving pin 3133 is disposed on the side of the upper LM block 3132, and the upper end of the first arm 31 may be rotatably disposed on the moving pin 3133 of the upper LM block 3132. Accordingly, when the first arm 31 pivots around the fixing pin 311*a* disposed on the fixed plate 10, the upper LM block 3132 coupled with the upper end of the first arm 31 may move in a straight line along the upper LM guide 3131 disposed on the lifting plate 20.

The upper end of the second arm 32 may be rotatably disposed on an upper fixing pin 322*a* disposed on the lower surface of the lifting plate 20. Accordingly, the second arm 32 may pivot at a certain angle around the upper fixing pin 322*a*.

The lower end of the second arm 32 may be disposed to be guided by a linear motion guide member 323 disposed on the upper surface of the fixed plate 10. For example, the linear motion guide member 323 may include an LM guide 3231 and an LM block 3232. The LM block 3232 is disposed to move linearly along the LM guide 3231. The lower end of the second arm 32 may be rotatably disposed on the LM block 3232. A moving pin 3233 is disposed on the side of the LM block 3232, and the lower end of the second arm 32 may be rotatably disposed on the moving pin 3233 of the LM block 3232. Accordingly, when the second arm 32 pivots around the upper fixing pin 322*a* disposed on the lifting plate 20, the LM block 3232 coupled with the lower end of the second arm 32 may move in a straight line along the LM guide 3231 disposed on the fixed plate 10.

Therefore, two fixing pins 311*a* and two linear motion guide members 323 corresponding to the pair of scissor arms 30 may be disposed on the upper surface of the fixed plate 10 at a defined distance. Two upper fixing pins 322*a* and two upper linear motion guide members 313 corresponding to the pair of scissor arms 30 may be disposed on the lower surface of the lifting plate 20 at a defined distance.

The motor 40 may be configured to move the moving ends 321 of the pair of scissor arms 30. The motor 40 is configured to generate power to move the moving ends 321 of the pair of scissor arms 30. Accordingly, when the motor 40 operates, the moving ends 321 of the pair of scissor arms 30 move in the horizontal direction so that the lifting plate 20 may move in the vertical direction.

The motor 40 may include a power transmission device that converts rotational motion into linear motion. The power transmission device may include a ball screw 41 and a ball nut 42.

The ball screw 41 is connected to a motor shaft 401 of the motor 40. The ball screw 41 and the motor shaft 401 may be connected by a coupler 44. Accordingly, when the motor shaft 401 rotates, the ball screw 41 rotates.

The ball nut 42 is engaged with the ball screw 41. When the ball screw 41 rotates, the ball nut 42 moves linearly.

The ball nut 42 is disposed at the center of the moving plate 43. Both ends of the moving plate 43 are fixed to the moving ends 321 of the pair of scissor arms 30. Therefore, when the ball nut 42 moves, the moving plate 43 may move linearly integrally with the ball nut 42. When the moving plate 43 moves in a straight line, the moving ends 321 of the pair of scissor arms 30 may also move in a straight line.

The linear movement of the moving plate 43 may be guided by the pair of linear motion guide members 323 that guide the linear movement of the moving ends 321 of the pair of scissor arms 30. In detail, the moving plate 43 may be disposed on the upper surface of the LM block 3232. Accordingly, the moving plate 43 may move linearly along the LM guide 3231 on which the LM block 3232 is disposed.

The moving pin 3233 may be disposed on the side of the LM block 3232. The moving end 321 of the scissor arm 30 is rotatably disposed on the moving pin 3233. Therefore, when the motor 40 operates and the moving plate 43 moves in a straight line, the LM block 3232 may move in a straight line along the LM guide 3231. When the LM block 3232 moves in a straight line, the moving end 321 of the scissor arm 30 may move in a straight line together with the LM block 3232. When the moving end 321 of the scissor arm 30 moves in a straight line, the lifting plate 20 disposed on the upper end of the scissor arm 30 may move in the vertical direction.

The load reduction device 50 may be configured to reduce the load applied to the motor 40 when the lifting plate 20 descends. The load reduction device 50 may be disposed adjacent to the moving end 321 of the scissor arm 30. The load reduction device 50 may be configured to apply a defined force to the moving end 321 of the scissor arm 30. The load reduction device 50 may be configured so that the force applied by the load reduction device 50 to the moving end 321 of the scissor arm 30 changes depending on the height of the lifting plate 20.

The load reduction device 50 may include a plurality of elastic bodies 52 and 54 connected in series.

The load reduction device 50 may include a moving bracket 51, a plurality of elastic bodies (e.g., a first elastic body 52 and a second elastic body 54), a plurality of engaging plates (e.g., a first engaging plate 53 and a second engaging plate 55), and a plurality of stopping plates (e.g., a first stopping plate 56 and a second stopping plate 57).

The moving bracket 51 may be connected to the moving end 321 of the scissor arm 30. The moving bracket 51 may be disposed to move integrally with the moving end 321 of the scissor arm 30. For example, the moving bracket 51 may be disposed at the tip of the moving pin 3233 disposed on the side of the LM block 3232. The moving bracket 51 is formed to fix and support one end of the plurality of elastic bodies (e.g., the first elastic body 52 and the second elastic body 54).

The plurality of elastic bodies (e.g., the first elastic body 52 and the second elastic body 54) are formed to reduce the load applied to the motor 40. The plurality of elastic bodies (e.g., the first elastic body 52 and the second elastic body 54) may be connected in series. One end of the plurality of elastic bodies (e.g., the first elastic body 52 and the second elastic body 54) connected in series may be connected to the moving bracket 51. An engaging plate may be disposed on the other end of the plurality of elastic bodies (e.g., the first elastic body 52 and the second elastic body 54).

The plurality of elastic bodies (e.g., the first elastic body 52 and the second elastic body 54) may have the same spring constant as each other or have different spring constants from each other.

As an example, the plurality of may be formed of coil springs.

The plurality of engaging plates (e.g., the first engaging plate 53 and the second engaging plate 55) may be disposed at the other end of the plurality of elastic bodies (e.g., the first elastic body 52 and the second elastic body 54) and between the plurality of elastic bodies (e.g., the first elastic body 52 and the second elastic body 54). The plurality of engaging plates (e.g., the first engaging plate 53 and the second engaging plate 55) are formed to be caught by the plurality of corresponding stopping plates (e.g., the first stopping plate 56 and the second stopping plate 57), respectively. The number of the plurality of engaging plates (e.g., the first engaging plate 53 and the second engaging plate 55) may be the same as the number of the plurality of elastic bodies (e.g., the first elastic body 52 and the second elastic body 54). For example, when the plurality of elastic bodies (e.g., the first elastic body 52 and the second elastic body 54) includes three elastic bodies, the plurality of engaging plates include three engaging plates. Accordingly, one engaging plate is disposed at the other end of one elastic body.

The plurality of elastic bodies (e.g., the first elastic body 52 and the second elastic body 54) and the plurality of engaging plates (e.g., the first engaging plate 53 and the second engaging plate 55) are disposed so that they may move integrally with the moving end 321 of the scissor arm 30.

The plurality of stopping plates (e.g., the first stopping plate 56 and the second stopping plate 57) may be formed to selectively engage with the plurality of engaging plates (e.g., the first engaging plate 53 and the second engaging plate 55). The number of the plurality of stopping plates (e.g., the first stopping plate 56 and the second stopping plate 57) may be the same as the number of the plurality of engaging plates (e.g., the first engaging plate 53 and the second engaging plate 55). For example, when the plurality of engaging plates (e.g., the first engaging plate 53 and the second engaging plate 55) include two engaging plates, the plurality of stopping plates (e.g., the first stopping plate 56 and the second stopping plate 57) may include two stopping plates. A first stopping plate 56 may be formed so that a first engaging plate 53 is caught, and a second stopping plate 57 may be formed so that a second engaging plate 55 is caught.

The plurality of stopping plates (e.g., the first stopping plate 56 and the second stopping plate 57) may be disposed on the upper surface of the fixed plate 10 on one side of the moving end 321 of the scissor arm 30. Therefore, when the moving end 321 of the scissor arm 30 moves, the plurality of stopping plates (e.g., the first stopping plate 56 and the second stopping plate 57) do not move. The plurality of elastic bodies (e.g., the first elastic body 52 and the second elastic body 54) and the plurality of engaging plates (e.g., the first engaging plate 53 and the second engaging plate 55)

may be located between the scissor arm 30 and the plurality of stopping plates (e.g., the first stopping plate 56 and the second stopping plate 57).

When the moving end 321 of the scissor arm 30 moves a certain distance in the direction away from the fixed end 311, the last engaging plate (e.g., the second engaging plate 55) disposed at the rear end of the last elastic body (e.g., the second elastic body 54) among the plurality of elastic bodies (e.g., the first elastic body 52 and the second elastic body 54) is caught by the last stopping plate (e.g., the second stopping plate 57) disposed closest to the fixed end 311 among the plurality of stopping plates (e.g., the first stopping plate 56 and the second stopping plate 57). The engaging plate (e.g., the first engaging plate 53) disposed at the rear end of other elastic body (e.g., the first elastic body 52) is not caught by the last stopping plate (e.g., the second stopping plate 57). Here, the last elastic body among the plurality of elastic bodies (e.g., the first elastic body 52 and the second elastic body 54) refers to the elastic body (e.g., the second elastic body 54) furthest from the moving bracket 51.

A string 71 of a string winder 70 may be connected to the last engaging plate (e.g., the second engaging plate 55) closest to the fixed end 311 of the scissor arm 30 among the plurality of engaging plates (e.g., the first engaging plate 53 and the second engaging plate 55). The string winder 70 is disposed adjacent to the fixed end 311 of the scissor arm 30 and configured to automatically wind or unwind the string 71 according to the movement of the moving end 321 of the scissor arm 30.

The string 71 of the string winder 70 is connected to the engaging plate (e.g., the second engaging plate 55) located furthest from the moving bracket 51 among the plurality of engaging plates (e.g., the first engaging plate 53 and the second engaging plate 55). When the tip of the string 71 of the string winder 70 is fixed to the engaging plate (e.g., the second engaging plate 55), a certain tension is applied to the string 71. Because the tension applied to the string 71 is small compared to the stiffness of the plurality of elastic bodies (e.g., the first elastic body 52 and the second elastic body 54), the plurality of elastic bodies (e.g., the first elastic body 52 and the second elastic body 54) are not extended by the tension applied to the string 71. Connecting the string 71 of the string winder 70 to the last engaging plate (e.g., the second engaging plate 55) among the plurality of engaging plates (e.g., the first engaging plate 53 and the second engaging plate 55) may help keep the plurality of elastic bodies (e.g., the first elastic body 52 and the second elastic body 54) in a straight line.

In this embodiment, the plurality of elastic bodies (e.g., the first elastic body 52 and the second elastic body 54) include two elastic bodies (e.g., the first elastic body 52 and the second elastic body 54). The first elastic body 52 and the second elastic body 54 are connected in series. That is, the first elastic body 52 and the second elastic body 54 may be arranged in a straight line. One end of the first elastic body 52 is fixed to the moving bracket 51.

The spring constant of the first elastic body 52 is greater than the spring constant of the second elastic body 54. That is, the stiffness of the first elastic body 52 is greater than the stiffness of the second elastic body 54.

In this embodiment, each of the first elastic body 52 and the second elastic body 54 is formed of a spring. That is, the first elastic body 52 is a first spring, and the second elastic body 54 is a second spring. The first and second springs may be formed as coil springs.

The plurality of engaging plates include a first engaging plate 53 and a second engaging plate 55.

The first engaging plate 53 is disposed at the other end of the first elastic body 52. Accordingly, one end of the first elastic body 52 is fixed to the moving bracket 51, and the other end of the first elastic body 52 is fixed to the first engaging plate 53. That is, the first elastic body 52 is disposed between the moving bracket 51 and the first engaging plate 53.

The first engaging plate 53 may include a first engaging portion 531 that is caught by the first stopping plate 56. The first engaging portion 531 may be disposed at the lower end of the first engaging plate 53. The first engaging portion 531 may be formed to be caught by the first stopping plate 56 but not caught by the second stopping plate 57.

The second engaging plate 55 is disposed at the other end of the second elastic body 54. Accordingly, one end of the second elastic body 54 is fixed to the first engaging plate 53, and the other end of the second elastic body 54 is fixed to the second engaging plate 55. That is, the first engaging plate 53 is interposed between the first elastic body 52 and the second elastic body 54. The second elastic body 54 is disposed between the first engaging plate 53 and the second engaging plate 55. The second engaging plate 55 is located closer than the first engaging plate 53 to the fixed end 311 of the scissor arm 30.

The second engaging plate 55 may include a second engaging portion 551 that is caught by the second stopping plate 57. The second engaging portion 551 may be disposed on one side of the second engaging plate 55. The second engaging portion 551 may be formed to be caught by the second stopping plate 57. The second engaging portion 551 may be formed so as not to be caught by the first stopping plate 56.

The plurality of stopping plates include a first stopping plate 56 and a second stopping plate 57. The first stopping plate 56 and the second stopping plate 57 are disposed on the upper surface of the fixed plate 10 at a defined distance apart.

The first stopping plate 56 is disposed on the fixed plate 10 so that the first engaging portion 531 of the first engaging plate 53 may be caught by the first stopping plate 56. When the first engaging plate 53 is caught by the first stopping plate 56, the first engaging plate 53 does not move as the moving end 321 of the scissor arm 30 moves. Accordingly, when the moving end 321 of the scissor arm 30 moves, the first elastic body 52 disposed on the first stopping plate 56 may be extended.

The second stopping plate 57 is disposed on the fixed plate 10 so that the second engaging portion 551 of the second engaging plate 55 may be caught by the second stopping plate 57. The second stopping plate 57 is formed so that the first engaging portion 531 of the first engaging plate 53 is not caught by the second stopping plate 57. The second stopping plate 57 is disposed closer than the first stopping plate 56 to the fixed end 311 of the scissor arm 30.

The second stopping plate 57 is spaced a defined distance away from the first stopping plate 56. The distance between the first stopping plate 56 and the second stopping plate 57 may be defined so that the first engaging plate 53 is caught by the first stopping plate 56 when the second elastic body 54 is extended to a defined length while the second engaging plate 55 is caught by the second stopping plate 57. For example, the distance between the first stopping plate 56 and the second stopping plate 57 may be defined so that when the second elastic body 54 is extended to its maximum, the first engaging plate 53 is caught by the first stopping plate 56.

When the second engaging plate 55 is caught by the second stopping plate 57, the second engaging plate 55 does not move as the moving end 321 of the scissor arm 30 moves. Therefore, when the moving end 321 of the scissor arm 30 moves further in the same direction, the first elastic body 52 and the first engaging plate 53 may move, and the second elastic body 54 may be extended. At this time, the first elastic body 52 may or may not be extended depending on the spring constant thereof and the load applied to the moving end 321.

When the moving end 321 of the scissor arm 30 continues to move in the same direction while the second engaging plate 55 is caught by the second stopping plate 57, the first engaging plate 53 may be caught by the first stopping plate 56. When the first engaging plate 53 is caught by the first stopping plate 56, the second elastic body 54 does not extend any further.

The first engaging plate 53 and the second engaging plate 55 may be guided by an engaging linear motion guide member 59. For example, the first engaging plate 53 may be disposed on a first LM block 591 of the engaging linear motion guide member 59, and the second engaging plate 55 may be disposed on a second LM block 592 of the engaging linear motion guide member 59. The first LM block 591 and the second LM block 592 may be slideably disposed on an LM guide 593 of the engaging linear motion guide member 59. Then, the linear movement of the first engaging plate 53 and the second engaging plate 55 by the moving end 321 of the scissor arm 30 may be guided by the first LM block 591, the second LM block 592, and the LM guide 593 of the engaging linear motion guide member 59.

However, guiding the linear movement of the first engaging plate 53 and the second engaging plate 55 is not limited to the first LM block 591, the second LM block 592, and the LM guide 593. The linear movement of the first engaging plate 53 and the second engaging plate 55 may be guided in various ways.

The string 71 of the string winder 70 may be connected to the second engaging plate 55. Because the tension applied to the string 71 by the string winder 70 is much smaller than the stiffness of the first elastic body 52 and the second elastic body 54, the first elastic body 52 and the second elastic body 54 are not extended by the tension of the string 71.

Therefore, when the moving end 321 of the scissor arm 30 moves away from the fixed end 311, the string 71 connected to the second engaging plate 55 is pulled out from the string winder 70 and becomes longer. When the moving end 321 of the scissor arm 30 moves in a direction closer to the fixed end 311, the string 71 connected to the second engaging plate 55 is automatically wound around the string winder 70 and becomes shorter.

Hereinafter, the operation of the scissor lift 1 according to one or more embodiments of the present disclosure will be described in detail with reference to FIGS. 4 to 10.

Figure 5:
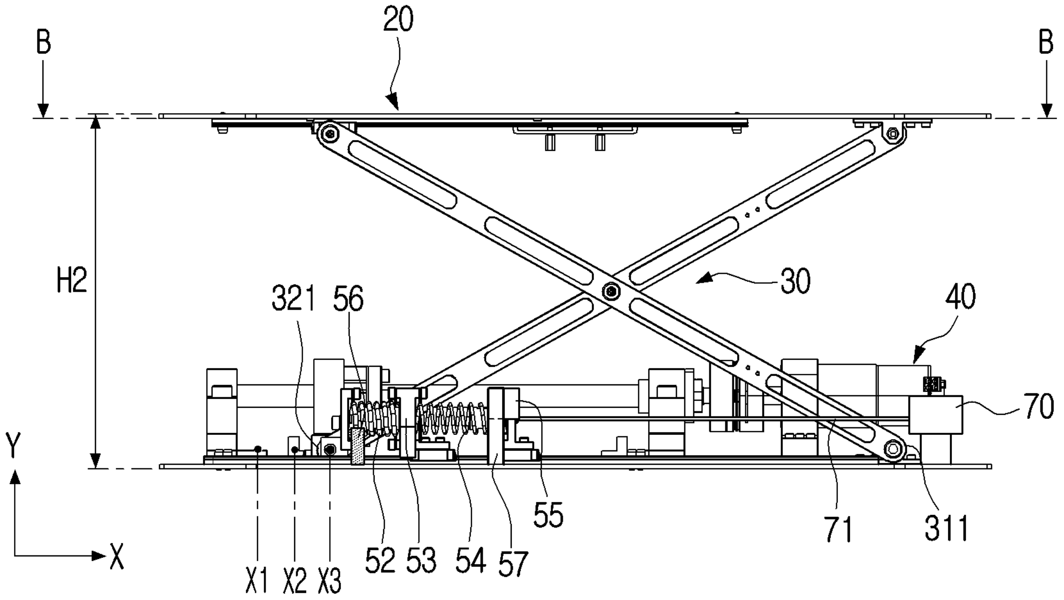
FIG. 5 is a side view illustrating a state in which a second engaging plate of a scissor lift according to one or more embodiments of the present disclosure is caught by a second stopping plate.
Figure 6:
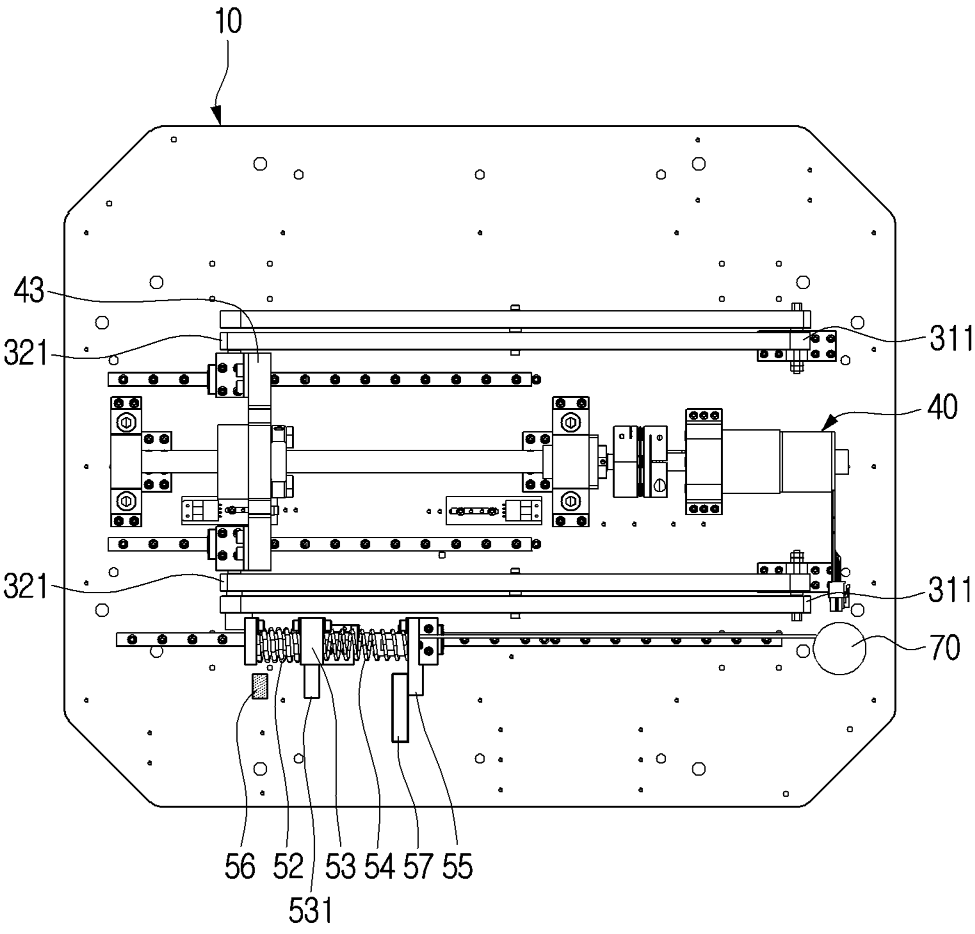
FIG. 6 is a cross-sectional view illustrating the scissor lift of FIG. 5 taken along a line B-B.
Figure 7:
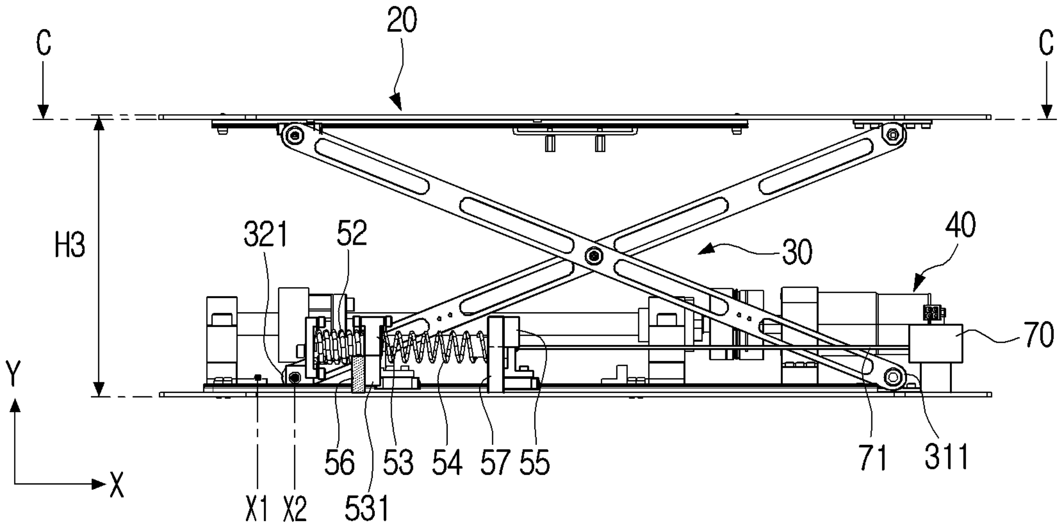
FIG. 7 is a side view illustrating a state in which a first engaging plate and a second engaging plate of a scissor lift according to one or more embodiments of the present disclosure are caught by a first stopping plate and a second stopping plate, respectively.
Figure 8:
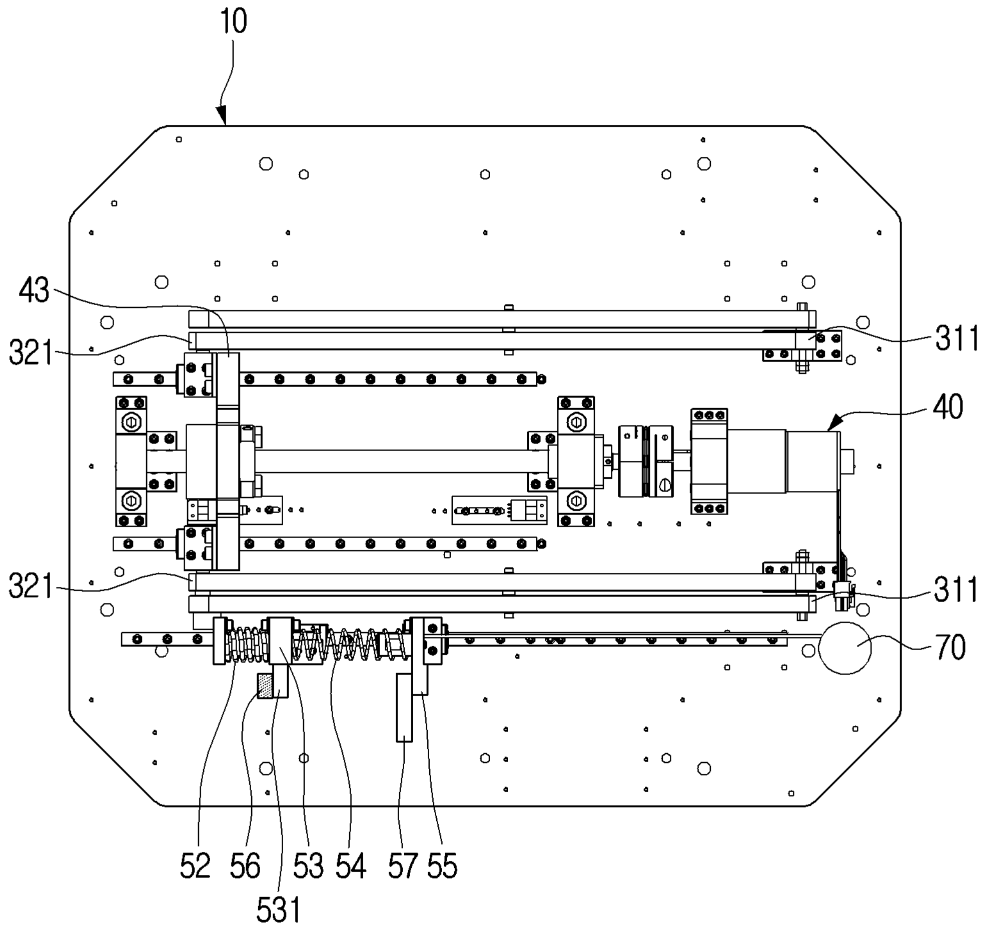
FIG. 8 is a cross-sectional view illustrating the scissor lift of FIG. 7 taken along a line C-C.
Figure 9:
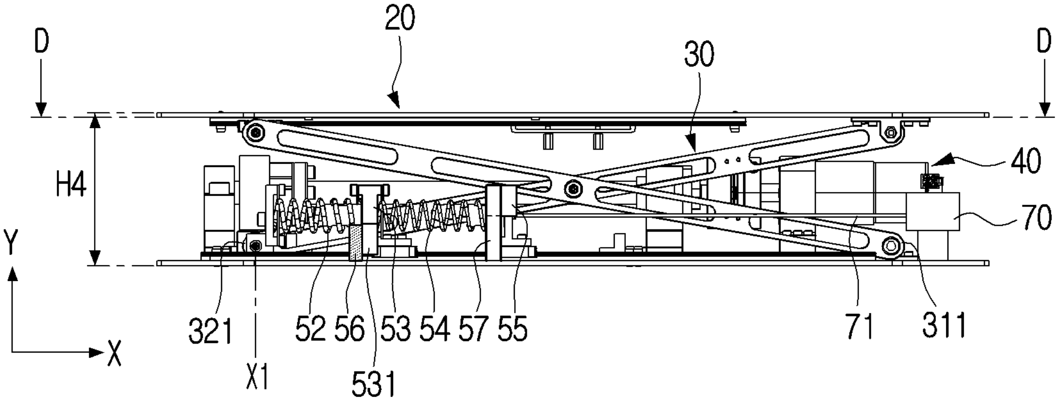
FIG. 9 is a side view illustrating a state in which a lifting plate of a scissor lift according to one or more embodiments of the present disclosure is located at the lowest height.
Figure 10:
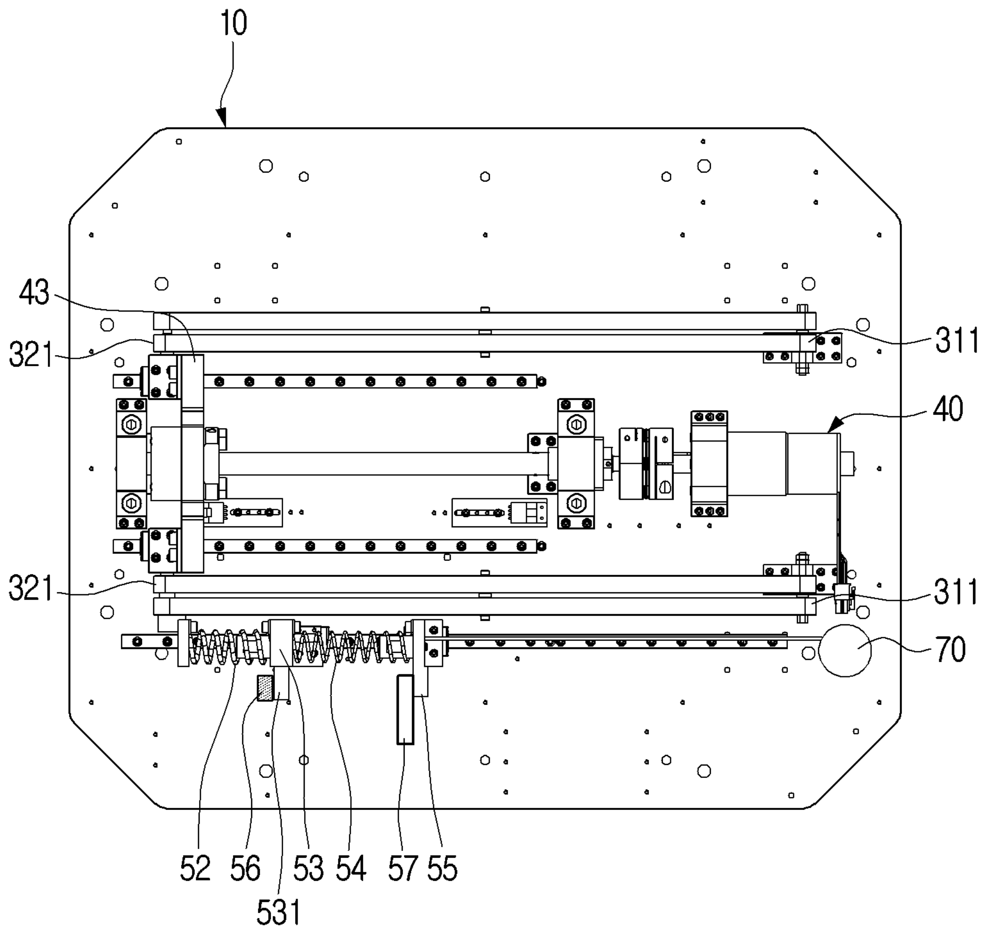
FIG. 10 is a cross-sectional view illustrating the scissor lift of FIG. 9 taken along a line D-D.

FIG. 5 is a side view illustrating a state in which a second engaging plate 55 of a scissor lift 1 according to one or more embodiments of the present disclosure is caught by a second stopping plate 57. FIG. 6 is a cross-sectional view illustrating the scissor lift 1 of FIG. 5 taken along a line B-B. FIG. 7 is a side view illustrating a state in which a first engaging plate 53 and a second engaging plate 55 of a scissor lift 1 according to one or more embodiments of the present disclosure is caught by a first stopping plate 56 and a second stopping plate 57, respectively. FIG. 8 is a cross-sectional view illustrating the scissor lift 1 of FIG. 7 taken along a line C-C. FIG. 9 is a side view illustrating a state in which a lifting plate 20 of a scissor lift 1 according to one or more embodiments of the present disclosure is located at the lowest height. FIG. 10 is a cross-sectional view illustrating the scissor lift 1 of FIG. 9 taken along a line D-D.

Referring to FIG. 4, the lifting plate 20 of the scissor lift 1 according to one or more embodiments of the present disclosure is located at the highest height H1. At this time, the load applied to the motor 40 of the scissor lift 1 is minimal.

In this state, when the motor shaft 401 of the motor 40 rotates in one direction, the moving plate 43 moves in a direction away from the fixed end 311 of the scissor arm 30 by the ball screw 41 and the ball nut 42. When the moving plate 43 moves away from the fixed end 311 of the scissor arm 30, the moving end 321 of the scissor arm 30 connected to the moving plate 43 moves in the direction away from the fixed end 311 (−X direction) (hereinafter, referred to as a first direction).

When the moving end 321 of the scissor arm 30 moves in the first direction, the first elastic body 52, the first engaging plate 53, the second elastic body 54, and the second engaging plate 55 of the load reduction device 50 disposed on the moving end 321 move in the first direction integrally with the moving end 321.

While the moving end 321 of the scissor arm 30 moves a certain distance in the first direction, the first elastic body 52, the first engaging plate 53, and the second elastic body 54 disposed on the moving end 321 may pass by the second stopping plate 57 without being caught by the second stopping plate 57.

When the moving end 321 of the scissor arm 30 moves further in the first direction, the second engaging plate 55 of the moving end 321 is caught by the second stopping plate 57. This state is shown in FIGS. 5 and 6.

Referring to FIGS. 5 and 6, the second engaging portion 551 of the second engaging plate 55 is caught by the second stopping plate 57. The first engaging plate 53 of the moving end 321 is located between the first stopping plate 56 and the second stopping plate 57. At this time, the lifting plate 20 moves a defined distance downward from the highest height H1 in FIG. 4 and is located at the height H2.

In this state, when the motor 40 operates and the moving end 321 of the scissor arm 30 moves further in the direction away from the fixed end 311, that is, in the first direction, the second engaging plate 55 is caught by the second stopping plate 57, so the second elastic body 54 is extended. The first elastic body 52 and the first engaging plate 53 may move in the first direction integrally with the moving end 321. When the moving end 321 of the scissor arm 30 moves in the first direction, the lifting plate 20 moves downward.

When the moving end 321 of the scissor arm 30 moves further in the first direction, the second elastic body 54 extends and the first engaging portion 531 of the first engaging plate 53 is caught by the first stopping plate 56. When the first engaging portion 531 of the first engaging plate 53 is caught by the first stopping plate 56, the first engaging plate 53 does not move as the moving end 321 of the scissor arm 30 moves in the first direction. This state is shown FIGS. 7 and 8.

Referring to FIGS. 7 and 8, the second engaging plate 55 is caught by the second stopping plate 57, and the first engaging plate 53 is caught by the first stopping plate 56. The first engaging portion 531 of the first engaging plate 53 of the moving end 321 is in contact with the first stopping plate 56, and the second engaging portion 551 of the second engaging plate 55 is in contact with the second stopping plate 57. At this time, the lifting plate 20 moves a defined distance downward from the height H2 in FIG. 5 and is located at the height H3.

From the time the second engaging plate 55 is caught by the second stopping plate 57 until the first engaging plate 53 is caught by the first stopping plate 56, the first elastic body 52 and the second elastic body 54 connected in series absorb the load applied to the moving end 321 of the scissor arm 30 by the object placed on the lifting plate 20, so that the load applied to the motor 40 by the object placed on the lifting plate 20 may be reduced.

In this state, when the motor 40 operates and the moving end 321 of the scissor arm 30 moves further in the direction away from the fixed end 311, that is, in the first direction, the first engaging plate 53 is caught by the first stopping plate 56, so the first engaging plate 53 does not move and the first elastic body 52 is extended. At this time, the second elastic body 54 is no longer extended and is located between the first stopping plate 56 and the second stopping plate 57. This state is shown in FIGS. 9 and 10.

Referring to FIGS. 9 and 10, the second engaging plate 55 is caught by the second stopping plate 57, and the first engaging plate 53 is caught by the first stopping plate 56. The first engaging portion 531 of the first engaging plate 53 of the moving end 321 is in contact with the first stopping plate 56, and the first elastic body 52 is fully extended. At this time, the lifting plate 20 moves a defined distance downward from the height H3 in FIG. 7. That is, the lifting plate 20 is located at the lowest height H4.

When the first elastic body 52 is extended by movement of the moving end 321 while the first engaging plate 53 is caught by the first stopping plate 56, the first elastic body 52 absorbs the load applied to the moving end 321 of the scissor arm 30 by the object placed on the lifting plate 20, so the load applied to the motor 40 by the object placed on the lifting plate 20 may be reduced.

Hereinafter, the effect of reducing the load applied to the motor 40 by the scissor lift 1 according to one or more embodiments of the present disclosure will be described with reference to FIG. 11.

Figure 11:
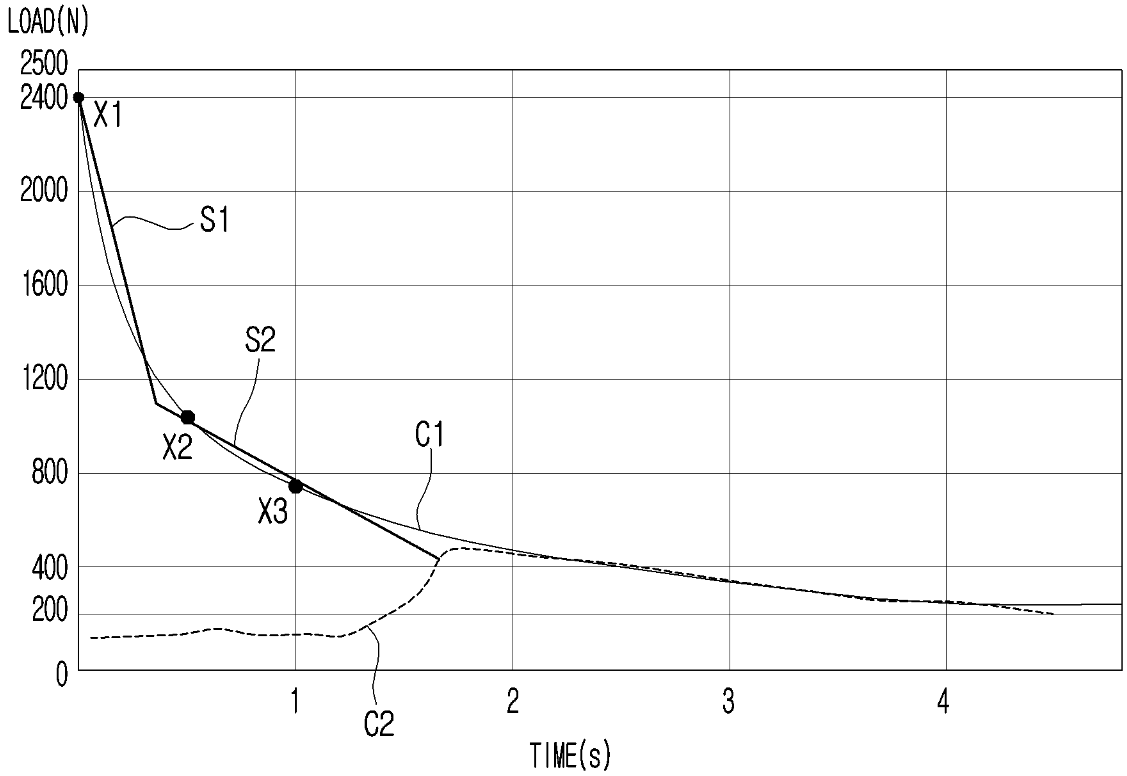
FIG. 11 is a graph illustrating a load applied to a motor of a scissor lift according to one or more embodiments of the present disclosure.

FIG. 11 is a graph illustrating a load applied to a motor 40 of a scissor lift 1 according to one or more embodiments of the present disclosure.

In FIG. 11, the X-axis represents the operating time of the scissor lift 1, and the Y-axis represents the load applied to the motor 40. That is, the X-axis represents the time for the lifting plate 20 of the scissor lift 1 to move from the lowest height H4 to the highest height H1, and the unit is seconds. The Y-axis represents the load applied to the motor 40 while the lifting plate 20 rises, and the unit is N.

The solid curve C1 represents the load applied to the motor while the lifting plate of the scissor lift according to a comparative embodiment rises, and the dotted curve C2 represents the load applied to the motor 40 while the lifting plate 20 of the scissor lift 1 according to one or more embodiments of the present disclosure rises. The scissor lift according to the comparative embodiment is the same as the scissor lift 1 according to one or more embodiments of the present disclosure except that it does not include the load reduction device.

In FIG. 11, the solid curve C1 and the dotted curve C2 represent the results of measuring the load applied to the motor 40 when raising the lifting plate 20 from the lowest height H4 to the highest height H1 with a 40 kg object placed on the lifting plate 20 of the scissor lift 1.

In FIG. 11, a point X1, a point X2, and a point X3 represent the positions of the moving end 321 of the scissor lift 1. In detail, the point X1 represents the position of the moving end 321 when the lifting plate 20 of the scissor lift 1 is at the lowest height H4 (see FIG. 9). The point X2 represents the position of the moving end 321 of the scissor lift 1 just before the first engaging plate 53 comes apart from the first stopping plate 56 (see FIG. 7). The point X3 represents the position of the moving end 321 of the scissor lift 1 just before the second engaging plate 55 comes apart from the second stopping plate 57 (see FIG. 5).

The straight line S1 represents a first spring force with which the load reduction device 50 supports the lifting plate 20 of the scissor lift 1 between the point X1 and the point X2. The straight line S2 represents a second spring force with which the load reduction device 50 supports the lifting plate 20 of the scissor lift 1 between the point X2 and the point X3.

In the case of including two springs, that is, the first spring (e.g., the first elastic body 52) and the second spring (e.g., the second elastic body 54), such as the load reduction device 50 according to one or more embodiments of the present disclosure, the first spring force refers to the elastic force of the first spring (e.g., the first elastic body 52). The second spring force refers to the equivalent elastic force of the first spring (e.g., the first elastic body 52) and the second spring (e.g., the second elastic body 54). The equivalent elastic force may be obtained using the equivalent spring constant of the first spring (e.g., the first elastic body 52) and the second spring (e.g., the second elastic body 54).

When the spring constant of the first spring (e.g., the first elastic body 52) is K1 and the spring constant of the second spring (e.g., the second elastic body 54) is K2, the equivalent spring constant of the first spring (e.g., the first elastic body 52) and the second spring (e.g., the second elastic body 54) is $Keq=(K1\times K2)/(K1+K2)$.

Referring to the solid curve C1, in the case of the scissor lift according to the comparative embodiment, the maximum load is applied to the motor 40 when the lifting plate 20 is at the lowest height, that is, at point X1. As the lifting plate 20 gradually rises from its minimum height, the load applied to the motor 40 decreases. When the lifting plate 20 is at its highest height, a minimum load is applied to the motor 40.

For example, when the 40 Kg object is loaded on the lifting plate 20, a load of approximately 2,410 N is applied to the motor 40 at the point X1, a load of approximately 1,030 N is applied to the motor 40 at the point X2, and a load of approximately 712 N is applied to the motor 40 at the point X3. When the lifting plate 20 is at the lowest height, a load of approximately 333 N is applied to the motor 40.

In the scissor lift 1 according to one or more embodiments of the present disclosure, the load applied to the motor 40 is reduced by the load reduction device 50. The result is shown as the dotted curve C2 in FIG. 11.

Referring to FIG. 11, while the moving end 321 of the scissor lift 1 moves from the point X1 to the point X2, the first spring force is applied to the moving end 321 of the scissor lift 1 by the load reduction device 50, so that the load applied to the motor 40 is reduced by the first spring force. Accordingly, in the scissor lift 1 according to one or more embodiments of the present disclosure, while the moving end 321 moves from the point X1 to the point X2, there is almost no load applied to the motor 40 by the weight of the object.

While the moving end 321 of the scissor lift 1 moves from the point X2 to the point X3, the second spring force is applied to the moving end 321 of the scissor lift 1 by the load reduction device 50, so that the load applied to the motor 40 is reduced by the second spring force. Accordingly, in the scissor lift 1 according to one or more embodiments of the present disclosure, while the moving end 321 moves from the point X2 to the point X3, there is almost no load applied to the motor 40 by the weight of the object.

While the moving end 321 of the scissor lift 1 moves from the point X3 to the position where the lifting plate 20 reaches the maximum height, the spring force is not applied to the moving end 321 by the load reduction device 50. Therefore, the load applied to the motor 40 gradually increases.

When the moving end 321 of the scissor lift 1 is located at a defined position, the load applied to the motor 40 of the scissor lift 1 according to one or more embodiments of the present disclosure is the same as the load applied to the motor of the scissor lift according to the comparative embodiment. This is shown in FIG. 11 as a section where the solid curve C1 and the dotted curve C2 overlap.

The scissor lift 1 according to one or more embodiments of the present disclosure having the structure described above may reduce the load applied to the motor 40 by using the load reduction device 50. Therefore, the scissor lift 1 according to one or more embodiments of the present disclosure may use the motor 40 with a small rated torque, so the size of the scissor lift 1 may be designed to be small, and the power required to operate the scissor lift 1 may be reduced.

In the scissor lift 1 described above, the plurality of stopping plates (e.g., the first stopping plate 56 and the second stopping plate 57) are fixed to the fixed plate 10, but embodiments of the present disclosure are not limited this. The scissor lift 1 according to one or more embodiments of the present disclosure may be configured to move a plurality of stopping plates depending on the weight of an object loaded on the lifting plate 20.

Hereinafter, the scissor lift 1 according to one or more embodiments of the present disclosure will be described with reference to FIGS. 12 to 14.

Figure 12:
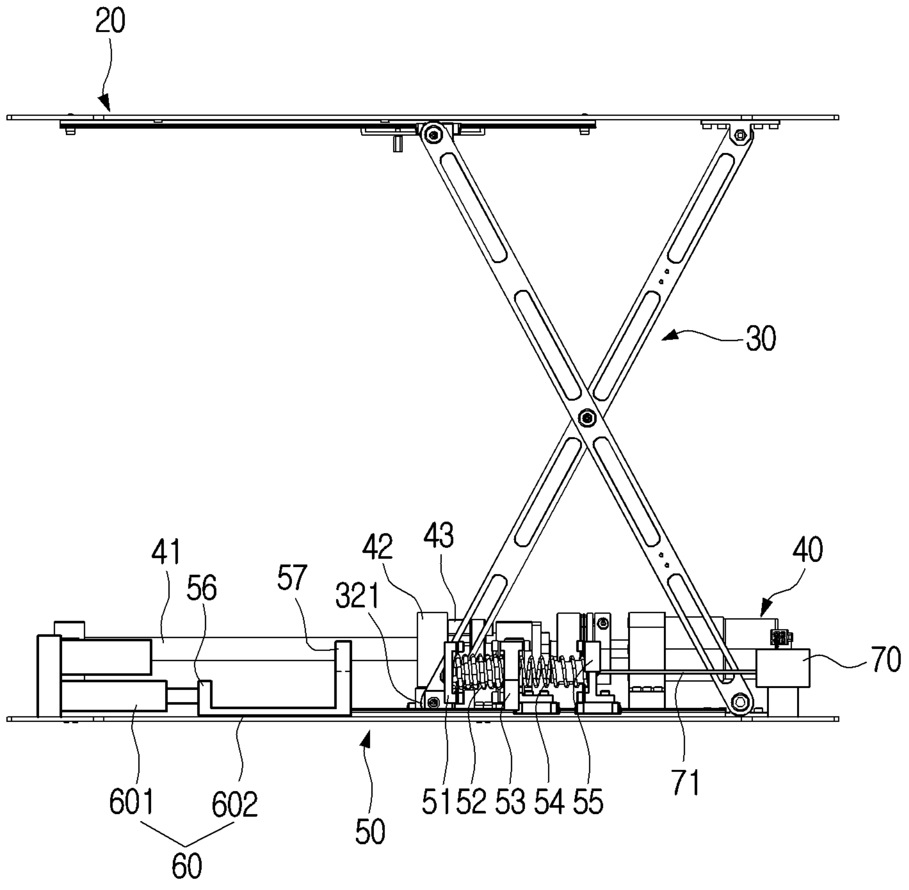
FIG. 12 is a side view illustrating a scissor lift according to one or more embodiments of the present disclosure.

FIG. 12 is a side view illustrating a scissor lift 1 according to one or more embodiments of the present disclosure.

Referring to FIG. 12, a scissor lift 1 according to one or more embodiments of the present disclosure may include a fixed plate 10, a lifting plate 20, a pair of scissor arms 30, a motor 40, and a load reduction device 50.

The fixed plate 10, the lifting plate 20, the pair of scissor arms 30, and the motor 40 are the same as those of the scissor lift 1 according to the above-described embodiment; therefore, repeated descriptions thereof may be omitted.

The load reduction device 50 may include a moving bracket 51, a plurality of elastic bodies (e.g., a first elastic body 52 and a second elastic body 54), a plurality of engaging plates (e.g., a first engaging plate 53 and a second engaging plate 55), and a stopping plate moving device 60.

Because the moving bracket 51, the plurality of elastic bodies (e.g., the first elastic body 52 and the second elastic body 54), and the plurality of engaging plates (e.g., the first engaging plate 53 and the second engaging plate 55) are the same as those of the load reduction device 50 according to the above-described embodiment, repeated descriptions thereof may be omitted.

The stopping plate moving device 60 may be configured to move the plurality of stopping plates (e.g., the first stopping plate 56 and the second stopping plate 57) according to the weight of an object placed on the lifting plate 20. The stopping plate moving device 60 may include a plurality of stopping plates (e.g., the first stopping plate 56 and the second stopping plate 57), a sliding plate 602, and an actuator 601.

Because the plurality of stopping plates (e.g., the first stopping plate 56 and the second stopping plate 57) are the same as those of the load reduction device 50 according to the above-described embodiment, repeated description thereof may be omitted. The plurality of stopping plates may include a first stopping plate 56 and a second stopping plate 57.

The sliding plate 602 connects the plurality of stopping plates (e.g., the first stopping plate 56 and the second stopping plate 57) so that the plurality of stopping plates (e.g., the first stopping plate 56 and the second stopping plate 57) move as one unit. The sliding plate 602 may be disposed to be slidable on the upper surface of the fixed plate 10.

The actuator 601 is configured to move the sliding plate 602 in a straight line. When the actuator 601 moves the sliding plate 602, the plurality of stopping plates (e.g., the first stopping plate 56 and the second stopping plate 57) may move integrally with the sliding plate 602. When the sliding plate 602 is moved by the actuator 601, the positions of the plurality of stopping plates (e.g., the first stopping plate 56 and the second stopping plate 57) may be changed. An electric linear actuator may be used as the actuator 601.

Figure 13:
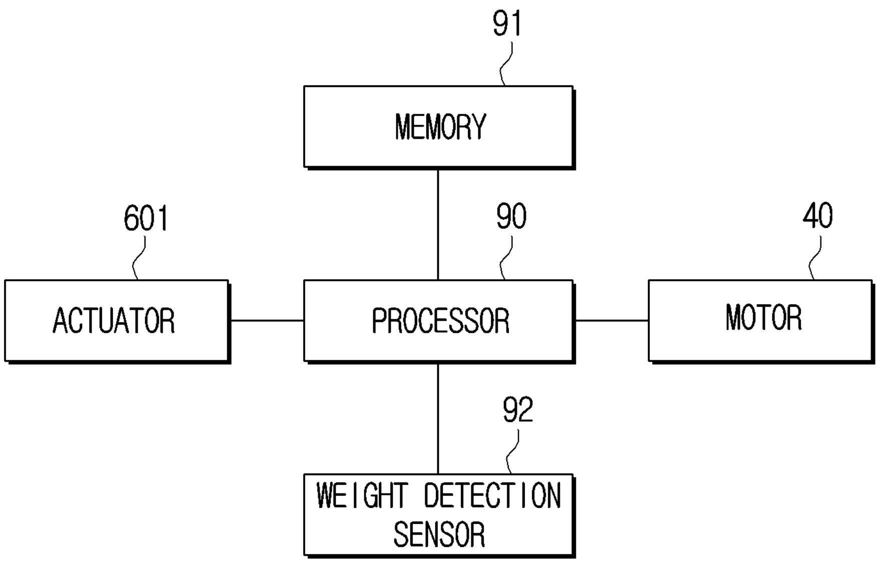
FIG. 13 is a block diagram of a scissor lift according to one or more embodiments of the present disclosure.

FIG. 13 is a block diagram of a scissor lift 1 according to one or more embodiments of the present disclosure.

Referring to FIG. 13, the scissor lift 1 according to one or more embodiments of the present disclosure may include a weight detection sensor 92 and a processor 90.

The weight detection sensor 92 may be configured to measure the weight of an object placed on the lifting plate 20. The weight detection sensor 92 may be disposed on the lifting plate 20. A load cell may be used as the weight detection sensor 92.

The processor 90 may be configured to control the stopping plate moving device 60 using a signal from the weight detection sensor 92. For example, the processor 90 may recognize the weight of the object loaded on the lifting plate 20 using a signal containing weight information transmitted from the weight detection sensor 92, and control the actuator 601 of the stopping plate moving device 60 depending on the recognized weight of the object to move the plurality of stopping plates (e.g., the first stopping plate 56 and the second stopping plate 57).

The positions of the plurality of stopping plates (e.g., the first stopping plate 56 and the second stopping plate 57) corresponding to the weight of the object may be stored in a memory 91. Therefore, when the processor 90 recognizes the weight of the object from the signal of the weight detection sensor 92, the processor 90 may recognize the appropriate positions of the plurality of stopping plates (e.g., the first stopping plate 56 and the second stopping plate 57) from the data stored in the memory 91, and control the actuator 601 to position the plurality of stopping plates (e.g., the first stopping plate 56 and the second stopping plate 57) at positions appropriate for the weight of the object.

In the above, the weight detection sensor 92 is used to detect the weight of the object loaded on the lifting plate 20, but embodiments of the present disclosure are not limited to this.

The load applied to the motor 40 of the scissor lift 1 changes depending on the weight of the object loaded on the lifting plate 20. Therefore, as another example, the scissor lift 1 may be configured to detect the load applied to the motor 40 and move the plurality of stopping plates (e.g., the first stopping plate 56 and the second stopping plate 57) in response to the detected load. Such a scissor lift 1 is illustrated in FIG. 14.

Figure 14:
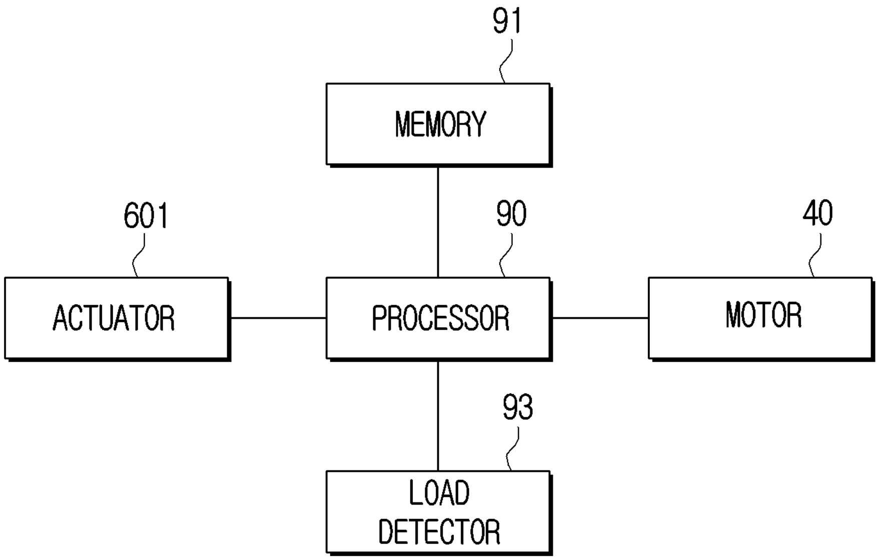
FIG. 14 is a block diagram of a scissor lift according to one or more embodiments of the present disclosure.

FIG. 14 is a block diagram of a scissor lift 1 according to one or more embodiments of the present disclosure.

Referring to FIG. 14, the scissor lift 1 according to one or more embodiments of the present disclosure may include a load detector 93 and a processor 90.

The load detector 93 is configured to detect the size of the load applied to the motor 40. For example, the load detector 93 may detect the size of the load applied to the motor 40 by detecting the current applied to a motor driver that drives the motor 40.

The processor 90 may be configured to control the stopping plate moving device 60 using a signal from the load detector 93. For example, the processor 90 may recognize the size of the load applied to the motor 40 using a signal containing the load information of the motor 40 transmitted from the load detector 93, and control the actuator 601 of the stopping plate moving device 60 depending on the recognized size of the load of the motor 40 to move the plurality of stopping plates (e.g., the first stopping plate 56 and the second stopping plate 57).

The positions of the plurality of stopping plates (e.g., the first stopping plate 56 and the second stopping plate 57) corresponding to the size of the load applied to the motor 40 (hereinafter, referred to as the load size of the motor 40) may be stored in a memory 91. Therefore, when the processor 90 recognizes the load size of the motor 40 from the signal of the load detector 93, the processor 90 may recognize the positions of the plurality of stopping plates (e.g., the first stopping plate 56 and the second stopping plate 57) appropriate for the load of the motor 40 from the data stored in the memory 91, and control the actuator 601 to position the plurality of stopping plates (e.g., the first stopping plate 56 and the second stopping plate 57) at the positions appropriate for the load of the motor 40.

As described above, by changing the positions of the plurality of stopping plates (e.g., the first stopping plate 56 and the second stopping plate 57), the load applied to the motor 40 may be reduced to maximum according to the weight of the object loaded on the lifting plate 20.

According to embodiments, the memory 91 may include computer instructions that are configured to, when executed by the processor 90, cause the processor 90 to perform its functions.

Figure 15:
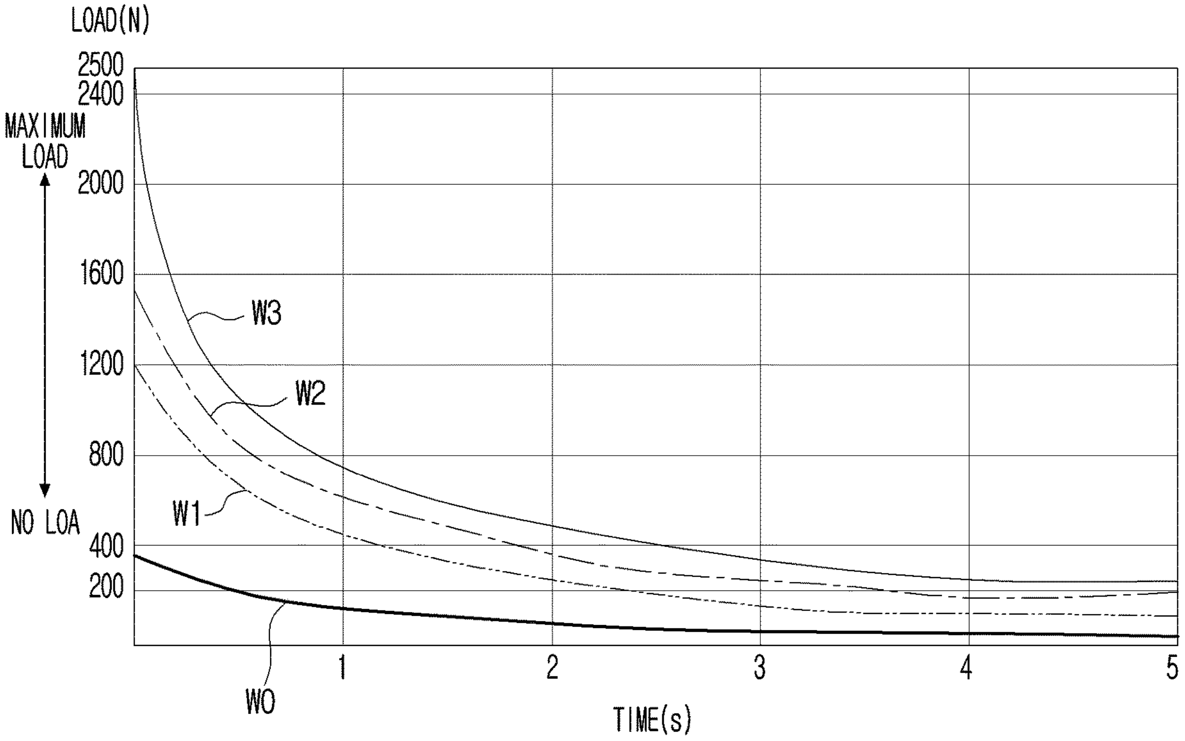
FIG. 15 is a graph illustrating a load applied to a motor depending on a weight loaded on a scissor lift according to one or more embodiments of the present disclosure.

FIG. 15 is a graph illustrating a load applied to a motor 40 depending on a weight loaded on a scissor lift 1 according to one or more embodiments of the present disclosure.

As illustrated in FIG. 15, the curves of the load applied to the motor 40 are different depending on the weight of the object loaded on the lifting plate 20.

In FIG. 15, the bottom curve W0 represents the case in which no object is loaded on the lifting plate 20. A curve W1, a curve W2, and a curve W3 represent the case in which an object is loaded on the lifting plate 20. The curve W3 represents the case in which an object of the maximum weight that can be loaded on the lifting plate 20 is loaded. The curve W2 represents the case in which an object that is lighter in weight than the object in the curve W3 and heavier than the object in the curve W1 is loaded on the lifting plate 20. The curve W1 represents the case in which an object weighing less than that of the curve W2 is loaded on the lifting plate 20.

The scissor lift 1 according to one or more embodiments of the present disclosure may appropriately position the plurality of stopping plates (e.g., the first stopping plate 56 and the second stopping plate 57) according to the weight of the object loaded on the lifting plate 20, so the loaded applied to the motor 40 may be minimized. For example, the scissor lift 1 according to one or more embodiments of the present disclosure may appropriately adjust the positions of the plurality of stopping plates (e.g., the first stopping plate 56 and the second stopping plate 57) to correspond to the bottom curve W0, the curve W1, the curve W2, and the curve W3 illustrated in FIG. 15.

Because the scissor lift 1 according to the embodiment illustrated in FIGS. 1 to 10 has the plurality of stopping plates (e.g., the first stopping plate 56 and the second stopping plate 57) fixed to the fixed plate 10, it may reduce the load applied to the motor 40 in response to one curve among the plurality of curves (e.g., the bottom curve W0, the curve W1, the curve W2, and the curve W3) in FIG. 15.

The scissor lift 1 described above is configured so that the plurality of stopping plates (e.g., the first stopping plate 56 and the second stopping plate 57) are moved by one actuator 601, but embodiments of the present disclosure are not limited to this. The scissor lift 1 according to one or more embodiments of the present disclosure may be configured to move the plurality of stopping plates (e.g., the first stopping plate 56 and the second stopping plate 57) using a plurality of actuators according to the weight of the object loaded on the lifting plate 20.

Hereinafter, with reference to FIGS. 16 to 18, the scissor lift 1 according to one or more embodiments of the present disclosure will be described.

Figure 16:
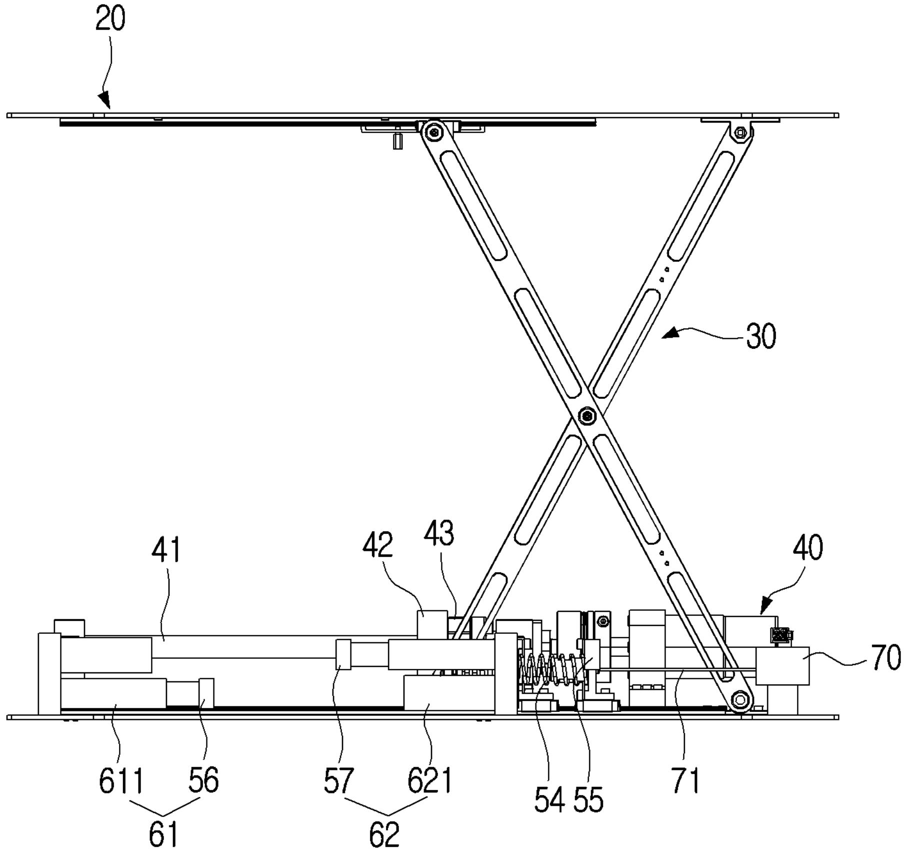
FIG. 16 is a side view illustrating a scissor lift according to one or more embodiments of the present disclosure.

FIG. 16 is a side view illustrating a scissor lift 1 according to one or more embodiments of the present disclosure.

Referring to FIG. 16, the scissor lift 1 according to one or more embodiments of the present disclosure may include a fixed plate 10, a lifting plate 20, a pair of scissor arms 30, a motor 40, and a load reduction device 50.

The fixed plate 10, the lifting plate 20, the pair of scissor arms 30, and the motor 40 are the same as those of the scissor lift 1 according to the above-described embodiment; therefore, repeated descriptions thereof may be omitted.

The load reduction device 50 may include a moving bracket 51, a plurality of elastic bodies 52 and 54, a plurality of engaging plates (e.g., a first engaging plate 53 and a second engaging plate 55), a first stopping plate moving device 61, and a second stopping plate moving device 62.

The moving bracket 51, the plurality of elastic bodies (e.g., the first elastic body 52 and the second elastic body 54), and the plurality of engaging plates (e.g., the first engaging plate 53 and the second engaging plate 55) are the same as those of the load reduction device 50 according to the above-described embodiment; therefore, repeated descriptions thereof may be omitted.

The first stopping plate moving device 61 may be configured to move the first stopping plate 56 according to the weight of the object placed on the lifting plate 20. The first stopping plate moving device 61 may include a first stopping plate 56 and a first actuator 611.

The first stopping plate 56 is similar to the first stopping plate 56 of the load reduction device 50 according to the above-described embodiment; therefore, a repeated description thereof may be omitted.

The first actuator 611 is formed to move the first stopping plate 56 in a straight line. When the first actuator 611 moves the first stopping plate 56, the position of the first stopping plate 56 may be changed. An electric linear actuator may be used as the first actuator 611.

The second stopping plate moving device 62 may be configured to move the second stopping plate 57 according to the weight of the object placed on the lifting plate 20. The second stopping plate moving device 62 may include the second stopping plate 57 and a second actuator 621.

The second stopping plate 57 is similar to the second stopping plate 57 of the load reduction device 50 according to the above-described embodiment; therefore, a repeated description thereof may be omitted.

The second actuator 621 is configured to move the second stopping plate 57 in a straight line. When the second actuator 621 moves the second stopping plate 57, the position of the second stopping plate 57 may be changed. An electric linear actuator may be used as the second actuator 621.

Figure 17:
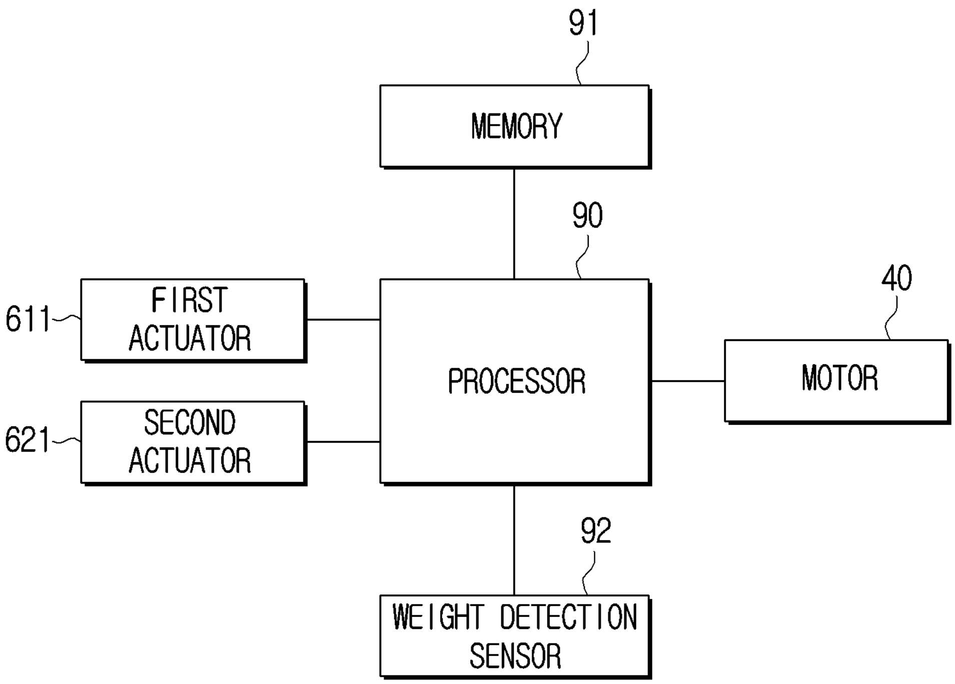
FIG. 17 is a block diagram of a scissor lift according to one or more embodiments of the present disclosure.

FIG. 17 is a block diagram of a scissor lift 1 according to one or more embodiments of the present disclosure.

Referring to FIG. 17, the scissor lift 1 according to one or more embodiments of the present disclosure may include a weight detection sensor 92 and a processor 90.

The weight detection sensor 92 is configured to measure the weight of an object placed on the lifting plate 20. The weight detection sensor 92 may be disposed on the lifting plate 20. A load cell may be used as the weight detection sensor 92.

The processor 90 may be configured to control the first stopping plate moving device 61 and the second stopping plate moving device 62 using a signal from the weight detection sensor 92. For example, the processor 90 may recognize the weight of the object loaded on the lifting plate 20 using a signal containing weight information transmitted from the weight detection sensor 92, and control the first actuator 611 of the first stopping plate moving device 61 and the second actuator 621 of the second stopping plate moving device 62 depending on the recognized weight of the object to move the first stopping plate 56 and the second stopping plate 57 individually.

The positions of the first stopping plate 56 and the second stopping plate 57 corresponding to the weight of the object may be stored in the memory 91. Therefore, when the processor 90 recognizes the weight of the object from the signal of the weight detection sensor 92, the processor 90 may recognize the appropriate positions of the first stopping plate 56 and the second stopping plate 57 from the data stored in the memory 91, control the first actuator 611 to position the first stopping plate 56 at an appropriate position corresponding to the weight of the object, and control the second actuator 621 to position the second stopping plate 57 at an appropriate position corresponding to the weight of the object.

In the above, the weight detection sensor 92 is used to detect the weight of the object loaded on the lifting plate 20, but embodiments of the present disclosure are not limited to this.

Because the load applied to the motor 40 of the scissor lift 1 changes depending on the weight of the object loaded on the lifting plate 20, the scissor lift 1 may be configured to detect the load applied to the motor 40 and move the first stopping plate 56 and the second stopping plate 57 according to the detected load. Such a scissor lift 1 is illustrated in FIG. 18.

Figure 18:
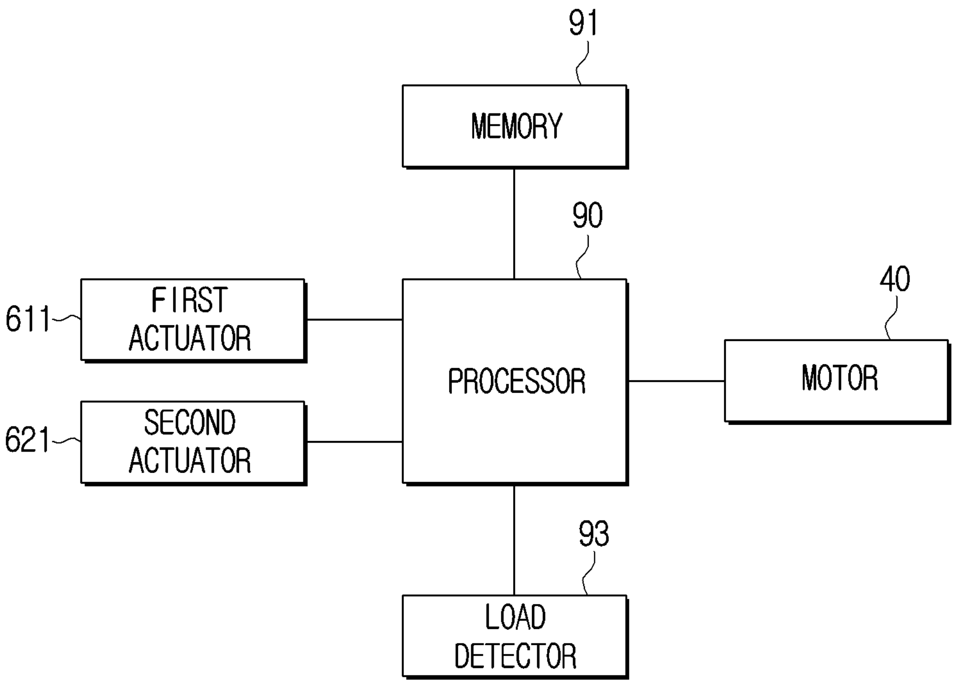
FIG. 18 is a block diagram of a scissor lift according to one or more embodiments of the present disclosure.

FIG. 18 is a block diagram of a scissor lift 1 according to one or more embodiments of the present disclosure.

Referring to FIG. 18, the scissor lift 1 according to one or more embodiments of the present disclosure may include a load detector 93 and a processor 90.

The load detector 93 is configured to detect the size of the load applied to the motor 40. For example, the load detector 93 may detect the size of the load applied to the motor 40 by detecting the current applied to a motor driver that drives the motor 40.

The processor 90 may be configured to control the first stopping plate moving device 61 and the second stopping plate moving device 62 using a signal from the load detector 93. For example, the processor 90 may recognize the size of the load applied to the motor 40 using a signal containing the load information of the motor 40 transmitted from the load detector 93, control the first actuator 611 of the first stopping plate moving device 61 depending on the recognized size of the load of the motor 40 to move the first stopping plate 56, and control the second actuator 621 of the second stopping plate moving device 62 depending on the recognized size of the load of the motor 40 to move the second stopping plate 57.

The positions of the first stopping plate 56 and the second stopping plate 57 corresponding to the size of the load applied to the motor 40 (hereinafter, referred to as the load size of the motor 40) may be stored in the memory 91. Therefore, when the processor 90 may recognize the load size of the motor 40 from a signal from the load detector 93, the processor 90 may recognize positions of the first stopping plate 56 and the second stopping plate 57 appropriate for the load of the motor 40 from the data stored in the memory 91, and control the first actuator 611 and the second actuator 621 to position the first stopping plate 56 and the second stopping plate 57 at the positions appropriate for the load of the motor 40.

As described above, when the positions of the first stopping plate 56 and the second stopping plate 57 are changed, the load applied to the motor 40 may be reduced to the maximum according to the weight of the object loaded on the lifting plate 20.

According to embodiments, the memory 91 may include computer instructions that are configured to, when executed by the processor 90, cause the processor 90 to perform its functions.

The scissor lift 1 according to one or more embodiments of the present disclosure may be disposed on a mobile robot.

Figure 19:
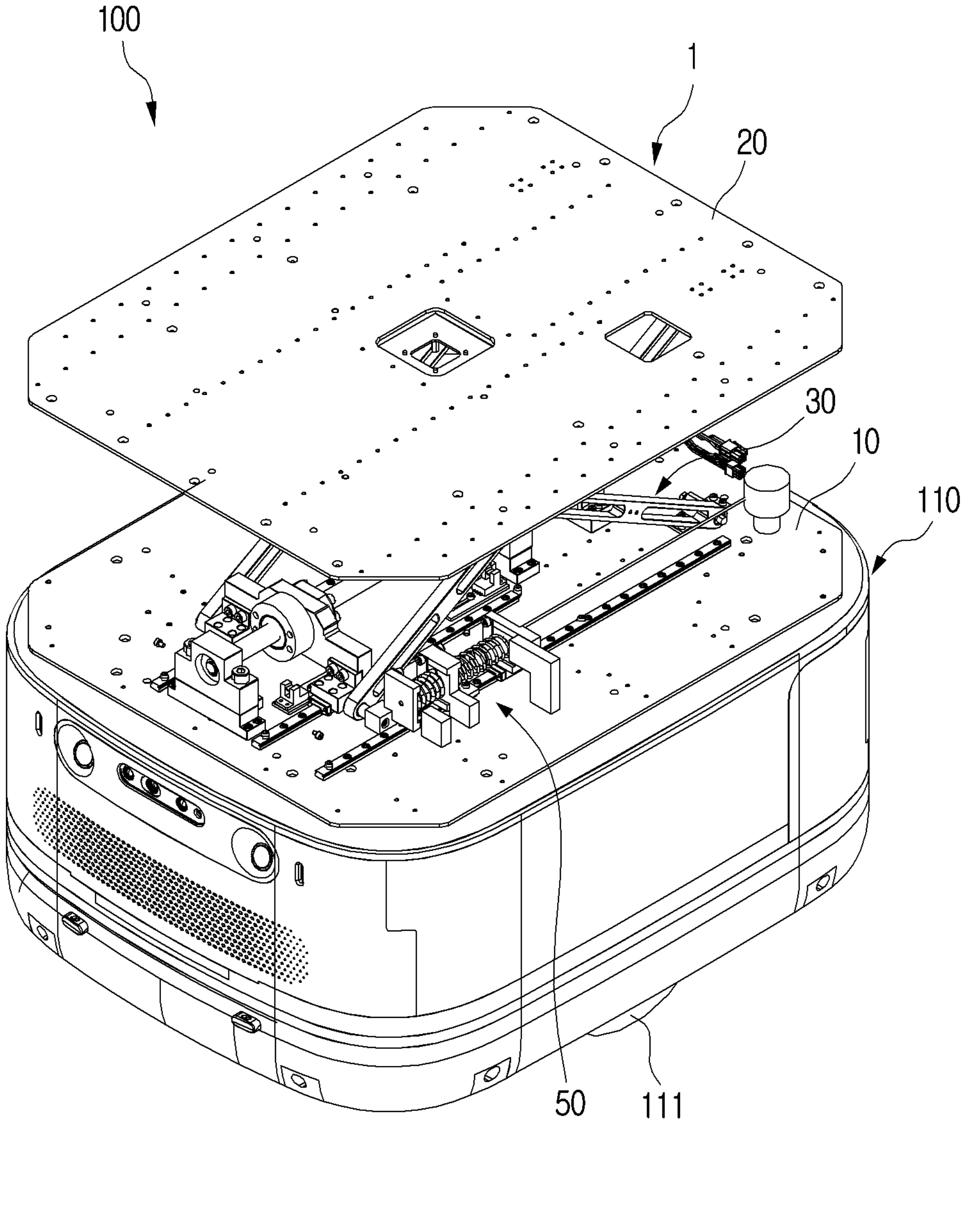
FIG. 19 is a view illustrating a mobile robot equipped with a scissor lift according to one or more embodiments of the present disclosure.

FIG. 19 is a view illustrating a mobile robot 100 equipped with a scissor lift 1 according to one or more embodiments of the present disclosure.

Referring to FIG. 19, a mobile robot 100 according to one or more embodiments of the present disclosure may include a main body 110 and a scissor lift 1.

The scissor lift 1 is disposed on the upper surface of the main body 110. By fixing the fixed plate 10 to the upper surface of the main body 110, the scissor lift 1 may be disposed on the main body 110.

The main body 110 is configured to move the scissor lift 1 to a designated position. In other words, the scissor lift 1 may autonomously travel and move to the designated position by the main body 110.

The main body 110 may include a moving device 111 (e.g., a mover), a position recognition sensor, a robot communication part, and a robot processor.

The moving device 111 may be configured to move the mobile robot 100 on a traveling surface. For example, the moving device 111 may include a pair of traveling wheels and a plurality of auxiliary wheels. The pair of traveling wheels and the plurality of auxiliary wheels may be disposed on the lower surface of the main body 110. The pair of traveling wheels may be rotatably disposed on the left and right sides of the lower surface of the main body 110. The plurality of auxiliary wheels may be disposed in front and behind the pair of traveling wheels on the lower surface of the main body 110.

However, the structure of the moving device 111 is not limited to the plurality of wheels. Moving devices of various structures may be used as long as they can move the mobile robot 100.

The position recognition sensor may be configured so that the mobile robot 100 recognizes its own position. The mobile robot 100 may recognize its own position using the position recognition sensor. For example, a sensor capable of recognizing the current position of the mobile robot 100, such as an image sensor, a light detection and ranging (LIDAR) sensor, and the like, may be used as the position recognition sensor.

The robot communication part may be configured to communicate wirelessly with external devices such as a server, a mobile device, and the like. For example, the robot communication part may receive information about the location of the destination and the height of the destination from the external device.

The robot communication part may be wirelessly connected to the external devices through various mobile communication methods such as Bluetooth, WiFi, 4G, and 5G.

The robot processor may be configured to control the mobile robot 100. For example, the robot processor may be configured to control the moving device 111, the position recognition sensor, the scissor lift 1, and the robot communication part.

The robot processor may control the moving device 111 to move the mobile robot 100. The robot processor may recognize the current location of the mobile robot 100 using the position recognition sensor. The robot processor may move the mobile robot 100 to the destination using the position recognition sensor and the moving device 111.

The robot processor may control the scissor lift 1 to adjust the height of the lifting plate 20. For example, when the mobile robot 100 is traveling, the robot processor may control the scissor lift 1 so that the lifting plate 20 is at the lowest height. In addition, when the mobile robot 100 arrives at the destination, the robot processor may control the scissor lift 1 so that the height of the lifting plate 20 matches the height of the destination.

The robot processor may control the processor 90 of the scissor lift 1 to adjust the height of the lifting plate 20 of the scissor lift 1. The robot processor may be configured to include the processor 90 of the scissor lift 1. In this case, the robot processor may control the motor 40 of the scissor lift 1.

Although non-limiting example embodiments have been illustrated and described above with reference to the accompanying drawings, it is understood by those skilled in the art that various modifications in form and detail may be made without departing from the spirit and scope of the present disclosure.

What is claimed is:

1. A scissor lift comprising:

a fixed plate;

a lifting plate above the fixed plate;

a pair of scissor arms between the fixed plate and the lifting plate and having an X shape, the pair of scissor arms comprising a first scissor arm and a second scissor arm, each of the first scissor arm and the second scissor arm comprising a fixed end fixed to the fixed plate and a moving end configured to move linearly with respect to the fixed plate;

a motor configured to move the moving end of the first scissor arm and the moving end of the second scissor arm;

a load reduction device configured to reduce a load applied to the motor in a case where the lifting plate descends, wherein the load reduction device comprises a plurality of elastic bodies on the moving end of the first scissor arm and connected in series, and wherein the load reduction device further comprises:

a moving bracket connected to the moving end of the first scissor arm, wherein one end of the plurality of elastic bodies is connected to the moving bracket;

a plurality of engaging plates at another end of the plurality of elastic bodies and between the plurality of elastic bodies;

a plurality of stopping plates configured to selectively engage with the plurality of engaging plates; and a string winder adjacent to the fixed end of the first scissor arm and comprising a string connected to an engaging plate furthest from the moving bracket among the plurality of engaging plates.

2. The scissor lift of claim 1, wherein the plurality of elastic bodies comprise:

a first elastic body, wherein one end of the first elastic body is connected to the moving bracket; and a second elastic body connected in series to the first elastic body.

3. The scissor lift of claim 2, wherein the plurality of engaging plates comprise:

a first engaging plate between another end of the first elastic body and one end of the second elastic body; and a second engaging plate at another end of the second elastic body and connected to the string of the string winder.

4. The scissor lift of claim 3, wherein the plurality of stopping plates comprise:

a first stopping plate configured to stop the first engaging plate; and a second stopping plate spaced a defined distance away from the first stopping plate and configured to not stop the first engaging plate and to stop the second engaging plate.

5. The scissor lift of claim 2, wherein the first elastic body and the second elastic body have a same spring constant as each other.

6. The scissor lift of claim 2, wherein a spring constant of the first elastic body is greater than a spring constant of the second elastic body.

7. The scissor lift of claim 1, further comprising:

a stopping plate moving device comprising an actuator; and a processor configured to control the stopping plate moving device to move the plurality of stopping plates according to a weight of an object on the lifting plate.

8. The scissor lift of claim 7, further comprising:

a weight detection sensor configured to measure the weight of the object on the lifting plate, wherein the processor is further configured to control the stopping plate moving device based on a signal from the weight detection sensor.

9. The scissor lift of claim 7, further comprising:

a load detector configured to detect a size of the load applied to the motor, wherein the processor is further configured to control the stopping plate moving device based on a signal from the load detector.

10. The scissor lift of claim 1, wherein in a case where the lifting plate is located at a lowest height, all the plurality of engaging plates are stopped by the plurality of stopping plates.

11. The scissor lift of claim 1, wherein in a case where the lifting plate is located at a highest height, the plurality of engaging plates are not stopped by the plurality of stopping plates.

12. A mobile robot comprising:
a main body configured to travel autonomously; and
a scissor lift on an upper surface of the main body,
wherein the scissor lift comprises:
a fixed plate;
a lifting plate above the fixed plate;
a pair of scissor arms between the fixed plate and the lifting plate and having an X shape, the pair of scissor arms comprising a first scissor arm and a second scissor arm, each of the first scissor arm and the second scissor arm comprising a fixed end fixed to the fixed plate and a moving end configured to move linearly with respect to the fixed plate;
a motor configured to move the moving end of the first scissor arm and the moving end of the second scissor arm; and
a load reduction device configured to reduce a load applied to the motor in a case where the lifting plate descends, and
wherein the load reduction device comprises a plurality of elastic bodies, the plurality of elastic bodies comprising a first elastic body and a second elastic body that are on the moving end of the first scissor arm and connected in series,
wherein the load reduction device further comprises:
a moving bracket connected to the moving end of the first scissor arm, wherein one end of the plurality of elastic bodies is connected to the moving bracket;
a plurality of engaging plates at another end of the plurality of elastic bodies and between the plurality of elastic bodies;
a plurality of stopping plates configured to selectively engage with the plurality of engaging plates; and
a string winder adjacent to the fixed end of the first scissor arm and comprising a string connected to an engaging plate furthest from the moving bracket among the plurality of engaging plates.

13. The mobile robot of claim 12,
wherein the plurality of engaging plates comprise:
a first engaging plate at another end of the first elastic body, wherein one end of the second elastic body is connected to the first engaging plate and the second elastic body is disposed in a straight line with the first elastic body;
a second engaging plate at another end of the second elastic body, and
wherein the plurality of stopping plates comprise:
a first stopping plate configured to stop the first engaging plate; and
a second stopping plate spaced apart from the first stopping plate by a defined distance, and the second stopping plate configured to not stop the first engaging plate and to stop the second engaging plate.

14. The mobile robot of claim 13, wherein
a spring constant of the first elastic body is greater than a spring constant of the second elastic body.

15. A lift comprising:
a fixed plate;
a lifting plate above the fixed plate;
a scissor arm between the fixed plate and the lifting plate and having an X shape, the scissor arm comprising a fixed end fixed to the fixed plate and a moving end configured to move linearly with respect to the fixed plate;
a motor configured to move the moving end of the scissor arm;
a load reduction device configured to reduce a load applied to the motor in a case where the lifting plate descends,
wherein the load reduction device comprises a plurality of elastic bodies on the moving end of the scissor arm and connected in series, and
wherein the load reduction device further comprises:
a moving bracket connected to the moving end of the scissor arm, wherein one end of the plurality of elastic bodies is connected to the moving bracket;
a plurality of engaging plates at another end of the plurality of elastic bodies and between the plurality of elastic bodies;
a plurality of stopping plates configured to selectively engage with the plurality of engaging plates; and
a string winder adjacent to the fixed end of the scissor arm and comprising a string connected to an engaging plate furthest from the moving bracket among the plurality of engaging plates.

16. The lift of claim 15, wherein the plurality of elastic bodies comprise:
a first elastic body, wherein one end of the first elastic body is connected to the moving bracket; and
a second elastic body connected in series to the first elastic body.

17. The lift of claim 16, wherein the plurality of engaging plates comprise:
a first engaging plate between another end of the first elastic body and one end of the second elastic body; and
a second engaging plate at another end of the second elastic body and connected to the string of the string winder.

18. The lift of claim 17, wherein the plurality of stopping plates comprise:
a first stopping plate configured to stop the first engaging plate; and
a second stopping plate spaced a defined distance away from the first stopping plate and configured to not stop the first engaging plate and to stop the second engaging plate.

* * * * *